US008873968B2

(12) United States Patent
Kikuchi

(10) Patent No.: US 8,873,968 B2
(45) Date of Patent: Oct. 28, 2014

(54) OPTICAL FIELD RECEIVER, OPTICAL MULTILEVEL SIGNAL RECEIVER, AND OPTICAL TRANSMISSION SYSTEM

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1015 days.

(21) Appl. No.: 12/300,212

(22) PCT Filed: May 11, 2006

(86) PCT No.: PCT/JP2006/309498
§ 371 (c)(1),
(2), (4) Date: Nov. 10, 2008

(87) PCT Pub. No.: WO2007/132503
PCT Pub. Date: Nov. 22, 2007

(65) Prior Publication Data
US 2009/0208224 A1    Aug. 20, 2009

(51) Int. Cl.
*H04B 10/12* (2006.01)
*H04B 10/69* (2013.01)
*H04B 10/67* (2013.01)

(52) U.S. Cl.
CPC ............. *H04B 10/672* (2013.01); *H04B 10/69* (2013.01)
USPC ........... 398/147; 398/202; 398/206; 398/207; 398/208; 398/212; 398/214

(58) Field of Classification Search
USPC ......................................... 398/202–214, 147
See application file for complete search history.

(56) References Cited

U.S. PATENT DOCUMENTS

| 5,432,819 A * | 7/1995 | Mui ............................... 375/329 |
| 7,623,796 B2 * | 11/2009 | Liu ................................ 398/202 |
| 2004/0141222 A1 | 7/2004 | Miyazaki et al. |
| 2007/0047972 A1 * | 3/2007 | Ikeuchi et al. ................ 398/207 |

OTHER PUBLICATIONS

Griffin, et al. "10 Gb/s Optical Differential Quadrature Phase Shift Key (DQPSK) Transmission using GaAs/AlGaAs Integration" OFC 2002 Postdeadline Papers.
K. Sekine, et al, "Proposal and Demonstration of 10-Gsymbol/sec 16-ary (40 Gbit/s) Optical Modulation/Demodulation Scheme", 2004.
M. G. Taylor, "Coherent Detection Method Using DSP to Demodulate Signal and for Subsequent Equalisation of Propagation Impairments", 2003.

(Continued)

*Primary Examiner* — Tod T Van Roy
(74) *Attorney, Agent, or Firm* — Mattingly & Malur, PC

(57) ABSTRACT

An optical field receiver comprises an optical branching circuit for branching a received optical multilevel signal into first and second optical signals, a first optical delayed demodulator for performing delayed demodulation on the first optical signal at a delay time T (T=symbol time), a second optical delayed demodulator for performing delayed demodulation on the second optical signal at the delay time T with an optical phase difference deviating from the first optical delayed demodulator by 90°, first and second optical receivers for converting each of the delayed demodulation signals representing x and y components of complex signals output from the first and second delayed demodulators into first and second electrical signals, and a field processing unit fort generating a first reconstructed signal representing an inter-symbol phase difference or a phase angle of a received symbol from the first and second electrical signals for each symbol time T.

20 Claims, 24 Drawing Sheets

(56) References Cited

OTHER PUBLICATIONS

S. Calabro, et al., "Improved Detection of Differential Phase Shift Keying Through Multi-Symbol Phase Estimation", 2005.

N. Kikuchi, et al., Study on Cross-Phase Modulation (XPM) Effect on Amplitude and Differentially Phase-Modulated Multilevel Signals in DWDM Transmission, IEEE Photonics Technology Letters, Jul. 2005, pp. 1549-1551, vol. 17.

S. Hayase et al.: "Chromatic dispersion and 1-3 SPM tolerance of 8-state/symbol (binary ASK and QPSK) modulated signal", Optical Fiber Communication Conference, 2004, IEEE, Feb. 23, 2004, the whole document.

\* cited by examiner

FIG. 2
(A) COHERENT OPTICAL FIELD RECEIVING SYSTEM (PRIOR ART)
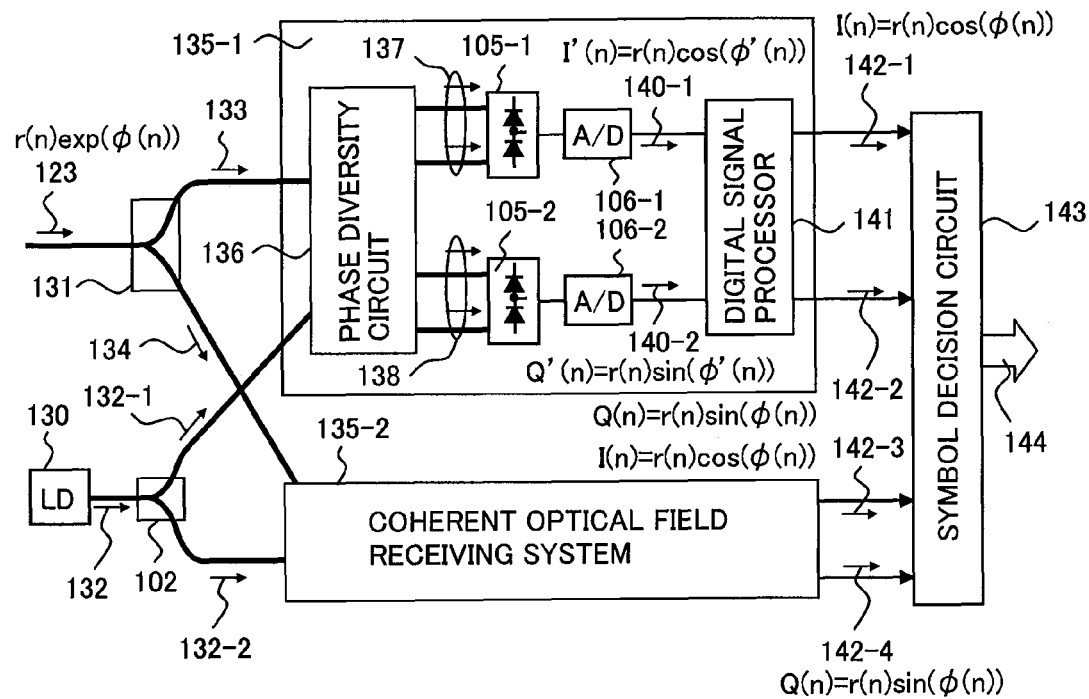
(B) INFLUENCE OF PHASE FLUCTUATION
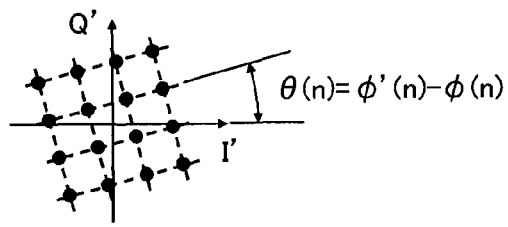

FIG. 3
(A) 8-LEVEL AMPLITUDE AND PHASE MODULATION (APSK)
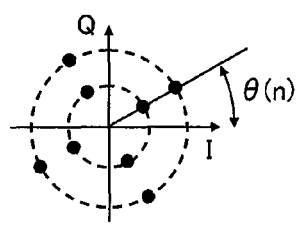
(B) OPTICAL MULTILEVEL SIGNAL RECEIVER FOR RECEIVING 8-LEVEL ASPK SIGNAL (PRIOR ART)
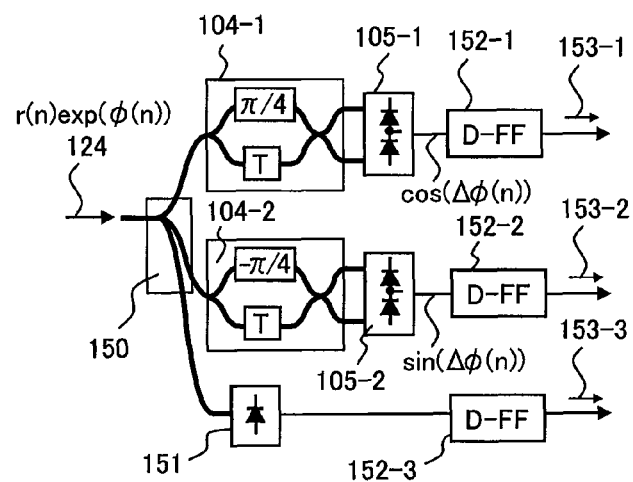

FIG. 6
(A) ELECTRICAL RECEIVED SIGNAL
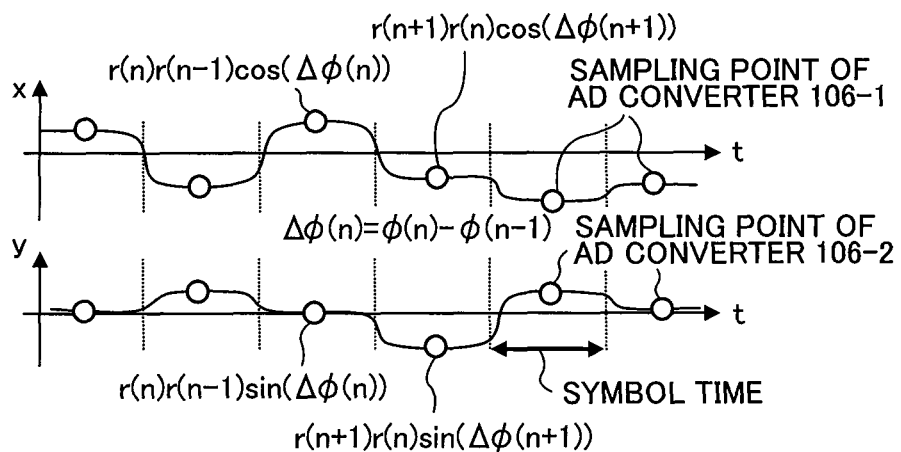
(B) RECONSTRUCTED FIELD SIGNAL
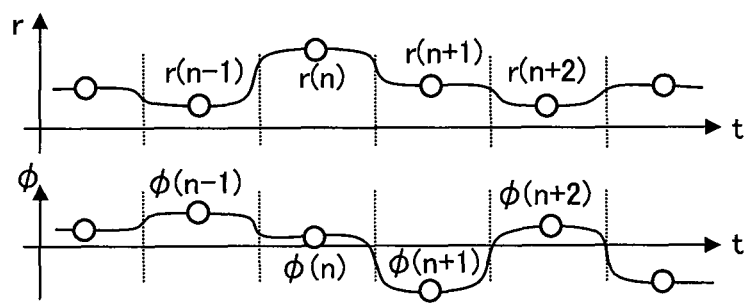

FIG. 9
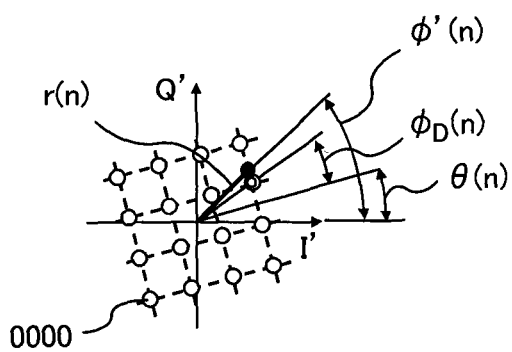
(A) SIGNAL POINT OF TIME n
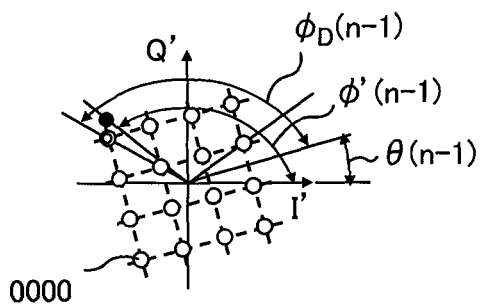
(B) SIGNAL POINT OF TIME n-1
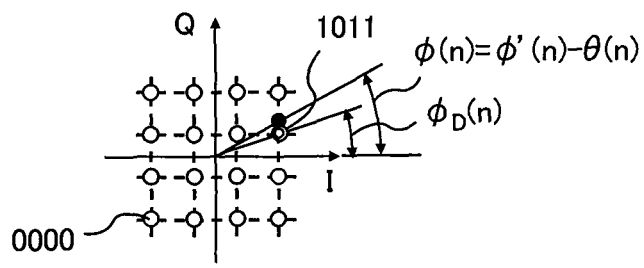
(C) SIGNAL POINT OF TIME n AFTER DELETING PHASE FLUCTUATION COMPONENT
●: SIGNAL POINT OF RECEIVED FIELD
◎: DISCRIMINATED SIGNAL POINT
$\phi'(n)$: PHASE ANGLE OF RECEIVED FIELD
$\theta_D(n)$: DISCRIMINATED PHASE ANGLE
$\theta(n)$: LOW-SPEED PHASE FLUCTUATION (A) SIGNAL CONSTELLATION OF 16-LEVEL AMPLITUDE AND PHASE MODULATION (B) DIFFERENTIAL PHASE MODULATION CODING TABLE

| Δφ(n) | (D3,D2,D1) |
|---|---|
| −3π/4 | (1,0,1) |
| −π/2 | (1,1,0) |
| −π/4 | (1,1,1) |
| 0 | (0,0,0) |
| π/4 | (0,0,1) |
| π/2 | (0,1,0) |
| 3π/4 | (0,1,1) |
| π | (1,0,0) |

(C) DIFFERENTIAL AMPLITUDE MODULATION CODING TABLE

| D4 | D4(n) |
|---|---|
| 0 | r(n−1) |
| 1 | not r(n−1) |

(D) DIFFERENTIAL AMPLITUDE MODULATION DECODING TABLE

| r(n)r(n−1) | D4 |
|---|---|
| 1 | 0 |
| a | 1 |
| $a^2$ | 0 |

FIG. 17
(A) ELECTRICAL RECEIVED SIGNAL
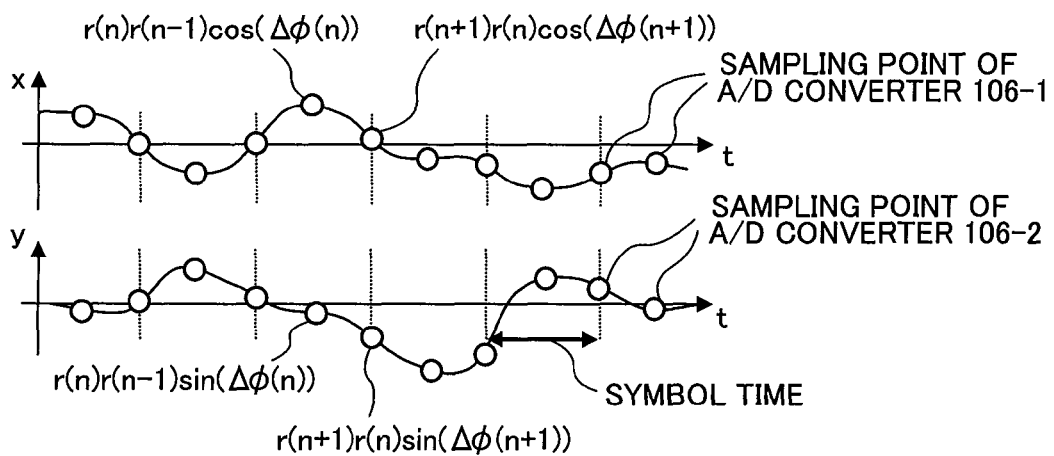
(B) RECONSTRUCTED FIELD SIGNAL
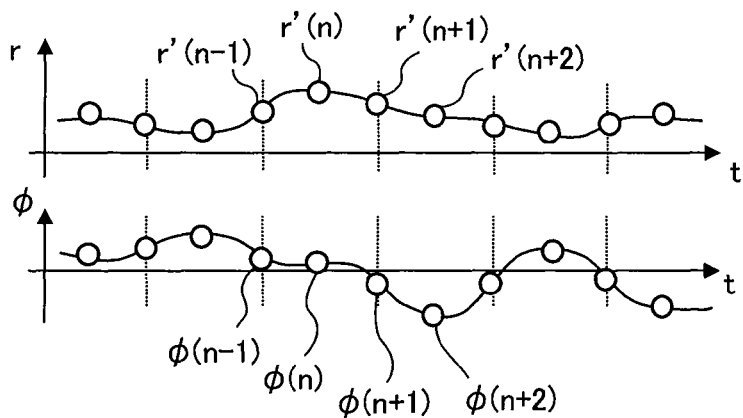

OPTICAL FIELD RECEIVER, OPTICAL MULTILEVEL SIGNAL RECEIVER, AND OPTICAL TRANSMISSION SYSTEM

TECHNICAL FIELD

The present invention relates to an optical information transmission technology, and more specifically, to an optical field receiver suitable for receiving an optical multilevel signal transmitted over an optical fiber, an optical multilevel signal receiver, and an optical transmission system.

BACKGROUND ART

In recent years, even though the quantity of information (transmission capacity) transmittable over one optical fiber continues to increase as the number of multiplexed wavelength channels increases and the modulation speed of an optical signal becomes faster and faster, the increase of the transmission capacity reaches a limit of approximately 10 T (Tera) bit/s. The main reason why it is difficult to increase the transmission capacity is that a wavelength bandwidth usable for the optical transmission reaches the maximum bandwidth of a wavelength bandwidth (a sum of C-band, L-band, and S-band corresponds to approximately 80 nm=10 THz) of an optical fiber amplifier. In order to further increase the transmission capacity of the optical fiber, a study was performed on a signal modulation scheme to increase the efficiency of spectral usage by packing as much as possible a number of optical signals in the limited spectrum.

In the world of wireless communication, the efficiency of spectral usage exceeds 10 by a multilevel modulation technology spread since the 1960s. As a result, high-efficiency transmission has been achieved. Since multilevel modulation has great prospects for optical fiber transmission, many studies on multilevel modulation have progressed from the past. For example, R. A. Griffin et al., "10 GB/s Optical Differential Quadrature Phase Shift Key (DQPSK) Transmission using GaAs/AlGaAs Integration," OFC2002, paper PD-FD6, 2003 (Non-Patent Document 1) discloses QPSK (Quadrature Phase Shift Keying) that performs quaternary phase shift keying and Kenro Sekine, Nobuhiko Kikuchi, Shinya Sasaki, Shigenori Hayase and Chie Hasegawa, "Proposal and Demonstration of 10-Gsymbol/sec 16-ary (40 Gbits/s) Optical Modulation/Demodulation Scheme", paper We3.4.5, ECOC 2004, 2004 (Non-Patent Document 2) discloses 16-level amplitude and phase modulation that is a combination of quaternary amplitude shift keying and quaternary phase shift keying.

FIGS. 1(A) to (D) show features of various modulation schemes in the prior art applicable to optical transmission, wherein a signal point (complex representation of the optical field at the decision timing) of optical modulation is plotted on a complex plane (IQ plane).

FIG. 1(A) shows a binary amplitude shift keying (BASK) that is widely used. The BASK transmits a 1-bit signal by only using the amplitude (high and low) while not using a phase. FIG. 1(B) shows a quaternary phase shift keying (QPSK) that transmits a 2-bit signal (11, 10, 01, 00) at one symbol by using a quaternary phase angle (0, π/2, n, −π/2).

FIG. 1(C) shows 16-level quadrature amplitude modulation (16QAM) widely used in wireless communication. The 16QAM, which has signal points arranged in a grid shape, can transmit a 4-bit signal at 1 symbol. In the example shown, a value of the upper 2 bits (11xx, 10xx, 01xx, 00xx) is represented on a Q-axis coordinate and a value of the lower 2 bits (xx11, xx10, xx01, xx00) is represented on an I-axis coordinate. Since the arrangement of the signal points makes a signal point distance large, it has been known that receiver sensitivity is high. However, an implementation example in a field of the optical communication has not yet been reported.

FIG. 1(D) shows a 16-level amplitude and phase modulation (16APSK) where signal points of a binary amplitude shift keying and signal points of a 8-level phase shift keying are arranged in a concentric circular shape and FIG. 1(E) shows a relationship between the amplitude and phase.

As described above, although various arrangements of the signal points of the multilevel signal are reviewed from the past, the receiver becomes complicated as the number of the multilevel increases. Further, if the number of multilevel increases, an inter-symbol interference in optical delayed demodulation for demodulating phase components increases, resulting in a problem that characteristics, such as receiver sensitivity, are rapidly degraded.

On the other hand, in order to increase the optical transmission capacity, a scheme that increases the modulation speed of each wavelength (channel) to about 10 Gbit/s to 40 Gbit/s has been studied. If the modulation speed is increased as described above, however, signal quality is significantly degraded due to the chromatic dispersion in the optical fiber or fiber non-linear effects, such as self-phase modulation. In the case of the optical transmission, the optical transmission distance is rapidly decreased as 1/(signal bit rate)$^2$ due to the influence of the chromatic dispersion. For this reason, in the optical transmission of 10 Gbit/s or more, an optical signal receiving end or an optical repeater should have optical dispersion compensators for compensating the chromatic dispersion in a transmission line. For example, in the optical transmission of 40 Gbit/s, since tolerance against the chromatic dispersion is no more than 5 km for a standard single-mode fiber, an adaptive compensation technology, which automatically controls a tunable chromatic dispersion compensator disposed in the optical signal receiving end so as to minimize the degradation of the signal quality, has been studied.

However, the tunable chromatic dispersion compensator has many problems to be solved, such as the size, complexity, cost, control speed, and the like of the device. In recent years, a configuration that disposes an electrical adaptive equalizer, such as a feed-forward equalizer (FEE) or a decision-feedback equalizer (DFE), in an electrical circuit of the optical signal receiver or an electric stage compensation technology that estimates a receiving symbol using a most likelihood sequence estimator (MLSE) has been studied. However, the chromatic dispersion compensation in the electric stage according to the prior art is incomplete because only an eye opening of a received optical waveform is enlarged. For this reason, the compensation effect is still not sufficient because it can effectively expand the chromatic dispersion tolerance of the receiver to 1.5 to 2 times, for example, and extend the transmission distance of 40 Gbit/s signals to just 10 km in the standard optical fiber transmission.

As one of the prior art that can solve the above-mentioned problems, for example, there is a coherent optical field receiving system that is disclosed in M. G. Taylor, "Coherent Detection Method Using DSP to Demodulate Signal and for Subsequent Equalization of Propagation Impairments," paper We4.P.111, ECOC 2003, 2003 (Non-Patent Document 3). In the coherent optical field receiving system, as shown in FIG. 2(A), the optical multilevel signal 123 transmitted over the optical fiber transmission line is split into horizontal (P) polarization component 133 and vertical (S) polarization component 134 by means of a polarization splitter 131 and then input to coherent optical field receivers 135-1 and 135-2, respectively.

The coherent optical field receiving system should have a local laser 130 having approximately the same wavelength as a transmitting laser. An output light (local light) 132 from the laser 130 is split into two local lights 132-1 and 132-2 by an optical splitter 102 and then input to the coherent optical field receivers 135-1 and 135-2, respectively.

The coherent optical field receiver 135-1 includes an optical phase diversity circuit 136 and a digital signal processor 141. The optical phase diversity circuit 136 generates an I (in-phase) component output light 137 and a Q (quadrature-phase) component output light 138 from the local light 132-1 and the P polarization component 133 of the input optical multilevel signal. The I (in-phase) component output light 137 is an in-phase component between the local light and the optical multilevel signal. The Q (quadrature-phase) component output light 138 is a quadrature-phase component between the local light and the optical multilevel signal. The I component output light 137 is supplied to a balanced optical receiver 105-1 and the Q component output light 138 is supplied to a balanced optical receiver 105-2. Analog electric signals output from the balanced optical receivers 105-1 and 105-2 are time-sampled by A/D converters 106-1 and 106-2, respectively, and then converted into digital signals.

In the following description, as shown in FIG. 1(E), the optical field of a received signal is defined as $r(n)\exp(\phi(n))$ and the optical field of the local lights 132-1 and 132-2 is marked by $\exp(-\theta(n))$. Here, r represents the amplitude of the optical field, $\phi$ represents the phase of the optical field, and n represents sampling timing and it is assumed that the amplitude of the local light 132 is a constant value "1". Further, $\theta(n)$ represents phase fluctuation which is generated by phase noise inherently included in the laser or by the difference of optical frequency between the local light and the signal light. Although the transmitting laser of the transmitter side has the phase noise, the phase noise is disregarded for simplification in the following explanation.

Each of the balanced optical receivers 105-1 and 105-2 performs homodyne detection of the input optical multilevel signal with the local light and outputs the in-phase component and the quadrature-phase component of the optical field of the input optical multilevel signal on the basis of the local light. As a result, the output signal 140-1 of the A/D converter 106-1 becomes $I'(n)=r(n)\cos(\phi'(n))$ and the output signal 140-2 of the A/D converter 106-2 becomes $Q'(n)=r(n)\sin(\theta'(n))$. For simplification, it is assumed here that $\phi'(n)=\phi(n)+\theta(n)$ and all the constants, such as conversion efficiency and the like, are "1".

If the phase fluctuation $\theta(n)$ is disregarded, $\phi'(n)=\phi(n)$. As a result, in the case of using the coherent optical field receiver, because all of the information (I and Q components in this case), which represents the optical field $r(n)\exp(\phi(n))$, is directly and simply obtained from the received optical multilevel signal 123, optical multilevel signal receiving should be possible. However, the influence of phase fluctuation $\theta(n)$ of the local light 132 can not actually be disregarded. It is assumed, for example, that the received optical multilevel signal is multilevel-modulated in the 16-level quadrature amplitude modulation (16QAM) as shown in FIG. 1(C). When the phase fluctuation $\theta(n)$ occurs, the signal constellation of the received signal rotates by $\theta(n)$ from an ideal position as equivalently shown in FIG. 2(B). Consequently, it becomes impossible to decide which symbol (signal point) is transmitted based on the foregoing $I'(n)$ and $Q'(n)$.

The digital signal processor 141 detects the slow rotation components (~several 100 MHz) of the signal point from the output signals of the A/D converters 106-1 and 106-2, eliminates the rotation components from the output signals of the A/D converters, assuming the rotation components as the phase fluctuation $\theta(n)$, by signal processing, and outputs to a symbol decision circuit 143 output signals 142-1 and 142-2 that represent the correct in-phase component $I(n)=r(n)\cos(\phi(n))$ and quadrature-phase component $Q(n)=r(n)\sin(\phi(n))$.

The coherent optical field receiver 135-1 performs the same operation as the coherent optical field receiver 135-2, such that it outputs the correct in-phase component $I(n)=r(n)\cos(\phi(n))$ and quadrature-phase component $Q(n)=r(n)\sin(\phi(n))$ as the output signals 142-3 and 142-4. The symbol decision circuit 143 judges with high accuracy which symbol is transmitted by comparing the I and Q components output from each digital signal processor 141 with the signal constellation shown in FIG. 1(C) and outputs a reconstructed multilevel digital signal 144.

By using the foregoing coherent optical field receiver, it is possible to generate all the field information required to decide the multilevel signal by compensating the degradation of the signal due to chromatic dispersion, etc., by the signal processing. Accordingly, in principle, the coherent optical field receiver can receive the complex multilevel signal. Further, the coherent optical field receiver has advantages in that linear degradation due to chromatic dispersion, etc., can be perfectly compensated logically by performing a correction processing on the input signal in accordance with an inverse function of a transfer function of the optical fiber transmission line by the digital signal processor 141, and there are no restrictions on the compensation quantity. However, since the small and high-speed digital signal processor 141 having signal processing performance of 10 G bit/s or more has not yet launched onto the market, the foregoing digital processing type coherent optical field receiver is still at the stage where offline processing is performed with a computer on the electric signals 140-1 and 140-2 obtained by using high-speed A/D converters to verify the results.

Meanwhile, FIG. 3(B) shows a configuration of the optical multilevel signal receiver for receiving the amplitude and phase modulation light, as disclosed by Non-Patent Document 2. FIG. 3(A) shows an example of an 8-level amplitude and phase modulation light (8APSK) where 8 signal points having quaternary phase and binary amplitude are arranged on a concentric circle. In the optical modulation where the phase components are equidistantly split like 8APSK signals, a differential coding is generally used for modulating the phase components. In the present example, each symbol transmits 3-bit information by correlating each symbol to a binary value amplitude and a quaternary value phase in which phase difference with its just previous symbol is any one of $0$, $\pi/2$, $\pi$, $-\pi/2$.

The optical multilevel signal receiver, which receives the 8APSK signal, uses an incoherent scheme that does not detect the optical field and as shown in FIG. 3(B), an input optical APSK signal 124 is branched into 3 optical signals by an optical branching circuit 150. Among them, two optical signals are input to optical delayed demodulators 104-1 and 104-2 and the remaining one optical signal is input to an optical intensity receiver 151. Each of the optical delayed demodulators 104-1 and 104-2 includes a first optical path that generates a delay of a symbol time T to the input signal and a second optical path that has a $-\pi/4$ optical phase shifter or a $+\pi/4$ optical phase shifter and converts the phase modulation components into the optical intensity signals by interfering a state (symbol) of a received optical signal with a symbol received previously by time T.

The intensity of light output from the optical delayed demodulator 104-1 having the +π/4 optical phase shifter is large when the phase difference between a received symbol and a symbol just before the symbol is 0 or +π/2 and is small when the phase difference between a received symbol and a symbol just before the symbol is −π/2 or π. The output light of the optical delayed demodulator 104-1 is received by the balanced optical receiver 105-1 and the output of the balanced optical receiver 105-1 is binary-decided by a binary decision circuit 152-1, making it possible to obtain a binary reconstructed digital signal 153-1 corresponding to 1 bit.

The intensity of light output from the optical delayed demodulator 104-2 having the −π/4 optical phase shifter is large when the phase difference between a received symbol and a symbol just before the symbol is 0 or −π/2 and is small when the phase difference between a received symbol and a symbol just before the symbol is π/2 or π. The output light of the optical delayed demodulator 104-2 is input to a binary decision circuit 152-2 through the balanced optical receiver 105-2, such that a binary reconstructed digital signal 153-2 corresponding to another 1 bit included in the phase component is reconstructed.

The optical intensity receiver 151 converts the optical intensity (a square of optical field amplitude) of the received signal into an electric signal. The output of the optical intensity receiver 151 is decided by the binary decision circuit 152-3, such that a binary reconstructed digital signal 153-3 corresponding to 1 bit included in the optical amplitude component is reconstructed. Since the optical multilevel signal receiver uses the optical delayed demodulator, there are advantages in that it can reduce the influence of the phase fluctuation θ(n) and polarization dependency and does not require the local laser, or the like. The optical multilevel signal receiver is applied to receive the APSK signal, up to 16 levels.

FIG. 4 shows a receiver for receiving binary phase shift keying light that is disclosed in S. Calabro, "Improved Detection of Differential Phase Shift Keying Through Multi-symbol Phase Estimation", paper We4.P.118, ECOC 2005, 25-29 Sep. 2005, Glasgow, Scotland, 2005 (Non-Patent Document 4).

In order to receive an optical signal 159 input from a binary differential phase shift keying (DPSK) with high sensitivity, the receiver adopts a decision feedback scheme which is used in wireless communication. In the present example, the input signal is branched into two optical signals and then input to the optical delayed demodulators 104-1 and 104-2. As in FIG. 3, the optical delayed demodulators 104-1 and 104-2 include a first optical path that imparts the delay of the symbol time T to the input signal and a second optical path that has an optical phase shifter having a phase angle of 0 or a π/2 optical phase shifter.

Here, the phase modulation component is represented by φ(n) and the optical field of the binary phase shift keying signal is represented by exp(φ(n)). When the outputs of the optical delayed demodulators 104-1 and 104-2 are input to the balanced optical receivers 105-1 and 105-2, respectively, the output signals of two balanced optical receivers are represented by cos(Δφ(n)) and sin(Δφ(n)). In this case, Δφ(n)=φ(n)−φ(n−1) and the amplitude component is standardized as "1" because it is constant.

If there is no noise, the output cos(Δφ(n)) value of the balanced optical receiver 105-1 corresponds to the differential phase shift keying Δφ(n). The output cos(Δφ(n)) value is "1" when Δφ(n)=0 and "−1" when Δφ(n)=π. As a result, the output cos(Δφ(n)) value of the balanced optical receiver 105-1 becomes a value corresponding to an information value of the DPSK signal. For this reason, in principle, the standard DPSK receiver directly inputs the output of the balanced optical receiver 105-1 to the binary decision circuit 152, making it possible to obtain the binary reconstructed digital signal 153 (when Δφ(n)=0, it is "1" and when Δφ(n)=π, it is "−1").

However, when the optical signal includes noise or intersymbol interference, as the phase φ(n−1) fluctuates in the just previous symbol, such a delayed demodulation generates an error in the decision of Δφ(n). In order to reduce the decision error of Δφ(n), the receiver shown in FIG. 4 adopts a decision-feedback scheme.

In detail, the differential phase shift keying components ("0" or "π") are canceled by multiplying the phase difference information cos Δφ(n−1) and sin Δφ(n−1) of the just previous symbol by the binary digital information output from the binary decision circuit 152 by using delay circuits 157-1 and 157-2 and multipliers 158-1 and 158-2, thereby extracting only the error components. A four-quadrant multiplier 156 generates a compensation signal from the extracted error components and new phase difference information φ(n). The compensation signal is then input to weighting circuits 155-1 and 155-2. The influence of the previous bit (symbol) is partially eliminated by adding the weighted compensation signal to the received signal by adders 154-1 and 154-2. Since the binary differential phase shift keying components cos(Δφ$_i$(n)) and sin(Δφ$_i$(n)) with increased accuracy is obtained from the adders 154-1 and 154-2, the error components of the binary decision result is reduced, making it possible to improve the receiver sensitivity.

As the above binary phase shift keying optical receiver has structural symmetry, it can be relatively easily expanded so as to receive the quaternary differential phase shift keying signal. However, it is difficult to expand to receiving optical multilevel signals of four levels or more due to the combination of the phase modulation and the amplitude modulation.

Non-Patent Document 1:
R. A. Griffin et al., "10 Gbits/s Optical Differential Quadrature Phase Shift Key (DQPSK) Transmission using GaAs/AlGaAs Integration," OFC2002, paper PD-FD6, 2003.

Non-Patent Document 2:
Kenro Sekine, Nobuhiko Kikuchi, Shinya Sasaki, Shigenori Hayase and Chie Hasegawa, "Proposal and Demonstration of 10-Gsymbol/sec 16-ary (40 Gbits/s) Optical Modulation/Demodulation Scheme", paper We3.4.5, ECOC 2004, 2004.

Non-Patent Document 3:
M. G. Taylor, "Coherent Detection Method Using DSP to Demodulate Signal and for Subsequent Equalization of Propagation Impairments," paper We4.P.111, ECOC 2003, 2003.

Non-Patent Document 4:
S. Calabro, "Improved Detection of Differential Phase Shift Keying Through Multi-symbol Phase Estimation", paper We4.P.118, ECOC 2005, 25-29 Sep. 2005, Glasgow, Scotland, 2005.

DISCLOSURE OF THE INVENTION

Problems to be Solved by the Invention

It is a first object of the present invention to provide a practical optical field receiver and an optical multilevel signal receiver that have no polarization dependency and do not need a local laser.

It is a second object of the present invention to provide an optical field receiver and an optical multilevel signal receiver capable of detecting all the field information (amplitude value of received symbol, phase angle, or inter-symbol phase difference) of an optical multilevel modulation signal required for deciding a symbol.

In an optical fiber transmission, it is known that a state of polarization of a transmission optical signal is largely fluctuating over time. In principle, the coherent optical field receiver described in FIG. 2 has polarization dependency. If the above described P polarization component is lost due to the fluctuation of polarization, the coherent optical field receiver 135-1 is in a disable state. Therefore, the coherent optical field receiving system shown in FIG. 2 is provided with the coherent optical field receiver 135-1 for receiving the P polarization component 133 of the optical multilevel signal and the coherent optical field receiver 135-2 for receiving the S polarization component, so as to configure a polarization diversity in which the symbol decision circuit 143 selects one of two receivers to decide the symbol.

Further, since the coherent optical field receiving system requires the local laser 130 whose wavelength approximately meets the received light, there is a problem that wavelength management is complicated. By adopting the polarization diversity configuration, the coherent optical field receiving system can receive the input optical signal even when the polarization state is fluctuating. In this case, there is a big problem in a practical use that the size of the hardware of the receiver becomes large because extra optical parts such as the polarization splitter 131 or the optical splitter 102 and the like are required.

On the other hand, the optical multilevel signal receiver described in FIG. 3 or the multilevel phase modulation receiver of the decision-feedback type described in FIG. 4 performs only the binary decision on the intensity of the received signal and the relative phase difference, but cannot detect all the information of the optical field, for example, the combination of the amplitude value and the absolute phase value that are required to decide the 16QAM signal in FIG. 1(C). This is because the optical delayed demodulator used for these schemes is designed to detect the intensity signal variable depending on the relative phase difference between two consecutive symbols on a time axis and it cannot detect the absolute phase of each symbol. Further, since the decision is limited to a binary value, the optical delayed demodulator cannot perform the 8-level detection of the relative phase difference and the like that is required to decide the 16 APSK signal in FIG. 1(D).

It is a third object of the present invention to provide an optical field receiver, an optical multilevel signal receiver and an optical transmission system that are widely applicable to plural kinds of optical modulation schemes different in the number of multilevel.

The coherent optical field receiver has advantage as to this problem. However, the incoherent type receiver, such as the optical multilevel signal receiver described in FIG. 3 or the decision-feedback type multilevel phase modulation receiver described in FIG. 4, has a structure that combines the binary decision of the received signal intensity and the binary decision of the relative phase difference. Accordingly, N pairs of receivers are required in principle when the number of multilevels of the symbol is increased by the N-th power of 2, such that the configuration of the receiver is complicated. This complication in the receiver configuration will become a big problem in practical use of the optical multilevel signal receiver when it requires more numbers of multilevels in the future. In these incoherent type receivers, since the structure changes depending on the modulation scheme of the received optical signal or the signal constellation, lack of generality is another problem. Although one optical intensity receiver receives an intensity multilevel modulation signal of 4 levels in Non-Patent Document 2, it is not easy to make the optical signal into a multilevel of four levels or more because a multilevel analog signal is significantly degraded in the electrical circuit stage.

It is a fourth object of the present invention to realize an optical field receiver that detects all the information of an optical field by an incoherent scheme and compensates for linear degradation occurred during the transmission. In the delayed demodulation, it is generally considered that since the output signal intensity is fluctuated by the amplitude modulation component when the optical signal has amplitude modulation components, only the coherent optical receiving scheme using a local laser can obtain the optical field information. If all the field information can be obtained when the multilevel modulated optical signal including the binary amplitude shift keying in the prior art is received, it becomes possible to realize the dispersion compensation with very high precision by compensating the linear degradation occurring during the transmission, in the electrical circuit stage of the receiver.

Means for Solving the Problems

In order to achieve the above objects, in an optical field receiver and an optical multilevel signal receiver according to the present invention, a received optical signal is input to a pair of optical delayed demodulators whose phases deviate by 90° from each other, delayed demodulation outputs are converted into electric signals, and optical field information is calculated by using a field processing unit. With the configuration, since homodyne detection is not performed, a local laser is not required. Further, since the optical delayed demodulator does not have polarization dependency, an optical field receiver having no polarization dependency can be realized.

In more detail, according to the present invention, two delayed demodulation signals representing an x component and y component (or I component and Q component) of a quadrature-phase component of a complex signal are generated from a pair of optical delayed demodulators, the phase components (inter-symbol phase difference) of the complex signal are calculated by the field processing unit, and a phase angle of the received symbol is calculated by subtracting the phase angle of a just previous symbol having been calculated in the past, from the phase components calculated this time. Further, the amplitude value of the complex signal is calculated from the two delayed demodulators and the amplitude value of the received symbol is calculated by dividing the amplitude value by another amplitude value of the just previous symbol having been calculated in the past.

The amplitude value of the received symbol may be calculated based on the output of an optical intensity detector provided separately from the optical delayed demodulator. These operations can be realized by an electrical digital signal processor by converting each of the output signals of the optical delayed demodulators into an electrical analog signal and converting the electrical analog signal into a digital signal by an A/D converter.

In the case where the received optical signal is a multilevel phase modulation signal, the optical field receiver and the optical multilevel signal receiver of the present invention are provided with a multilevel symbol decision circuit that decides the received symbol from the inter-symbol phase difference calculated by the field processing unit. Further, in the case where the received optical signal is an optical multilevel modulation signal of a combination of the amplitude modulation and the phase modulation, for example, as a QAM signal or an APSK signal, the optical field receiver and the optical multilevel signal receiver of the present invention are provided with a multilevel symbol decision circuit that judges the received symbol based on the amplitude value and the phase component (inter-symbol phase difference or symbol phase angle) or the in-phase component and the quadrature-phase component of the optical field calculated by the field processing unit. In receiving such an optical multilevel signal as described above, there is a problem of a low-speed fluctuation in the phase or the amplitude. However, the fluctuation component can be eliminated, for example, by adapting such technologies as decision-feedback operation and the like to the multilevel symbol decision.

In a first embodiment of the present invention, each of the delay time T of the optical delayed demodulator and the sampling time of the A/D converter is made ½f or less (f is the peak frequency component of the input optical signal) so as to satisfy the Nyquist Theorem. Thereby, since a copy of a perfect input optical waveform can be reconstructed, including the time domain, as the digital optical field signal, it becomes possible to mitigate the restriction of the optical transmission distance due to the waveform degradation caused by the chromatic dispersion.

Further, for example, if inverse operation of the optical transmission line propagation characteristic is performed on the reconstructed optical field signal by the optical field compensator, the chromatic dispersion can be compensated more perfectly. In this case, it is necessary to designate the quantity of chromatic dispersion to be compensated to the optical field compensator. In the case where the chromatic dispersion value is already known, a fixed compensation value may be designated previously. If the chromatic dispersion value is not known, it is preferable to adopt an adaptive compensation type optical field compensator, in which the compensation value is automatically changed in accordance with the receiving state. Moreover, in the case where the compensation value of the quantity of chromatic dispersion or the proper compensation algorithm can be determined by an external equipment, the external equipment can set the compensation value for the optical field compensator.

For example, in the case where the optical field receiver and the optical multilevel signal receiver of the present invention are arranged in association with optical transmission equipment configuring an optical network, the total quantity of chromatic dispersion of the optical fiber along the optical signal path is calculated by a control terminal connected to the optical network. By transmitting the calculated value to the optical transmission equipment at the optical signal receiving side and providing it as an initial value of the compensation quantity to the optical field compensators of the optical field receiver and the optical multilevel signal receiver, it becomes possible to set an optimal quantity of compensation. According to this scheme, since a recalculated quantity of compensation can be rapidly set in the optical field compensator when the optical signal path is changed within the optical network, it becomes possible to make the adaptive compensation type optical field compensator unnecessary and to shorten the time to pull in the adaptive compensation control into the optimal state.

Effects of the Invention

Since the optical delayed demodulator is used, the present invention does not depend on the polarization state of the input light. Further, since a local laser is not needed unlike the coherent detection scheme in the prior art, the present invention can simplify the configuration of the receiver. In the incoherent type optical multilevel receiver in the prior art, the size of the circuit becomes large as the number of multilevel of the received signal is increased. However, since the optical field receiver and the optical multilevel receiver of the present invention can directly reconstruct the two-dimensional coordinate information on the complex plane of the received optical field, it is possible to decide the symbol of the received signal with a practical size of the hardware even when the number of multilevel of the optical modulation signal becomes large to improve the transmission efficiency. Furthermore, according to the present invention, since the field processing or multilevel decision of the received optical signal can be realized by an electrical digital circuit, a receiver having the same configuration is applicable to optical signals that are different in terms of the number of multilevel or the modulation scheme.

BEST MODES FOR CARRYING OUT THE INVENTION

Hereinafter, some of embodiments of the present invention will be explained by referring to drawings.

First Embodiment

FIG. 5 shows a first embodiment of an optical field receiver 100 according to the present invention. In FIG. 5, a path of an optical signal is represented by a thick line and a path of an electric signal is represented by a thin line.

An input optical signal 101 represented by equation $r(n)\exp(\phi(n))$ is branched into two optical signals by an optical branching circuit 102, as in the decision-feedback type multilevel phase modulation receiver according to the prior art described in FIG. 4, to input to optical delayed demodulators 104-1 and 104-2. The optical delayed demodulators 104-1 and 104-2 include a first optical path that imparts a delay of a symbol time T to the input signal and a second optical path that has a phase shifter having a phase angle of 0 or $\pi/2$ so that the phases in the two demodulators deviate by $\pi/2$ from each other, thereby to interfere a state (symbol) of the phase shifted optical multilevel signal with a symbol received previously by time T.

The optical signals output from the optical delayed demodulators 104-1 and 104-2 are converted into electric signals by balanced optical receivers (optical detectors) 105-1 and 105-2, and converted into digital signals by A/D converters 106-1 and 106-2, respectively. The digital signals output from the A/D converters 106-1 and 106-2 are supplied to a field processing unit 111 as electrical received signals 110-1 and 110-2 after adjusting deviations in timings of the two signal paths so as to be symbol time T or less by delay adjusting circuit 108-1 and 108-2, respectively.

The electrical received signals 110-1 and 110-2 are complex signals and expressed as $x=r(n)r(n-1)\cos(\Delta\phi(n))$ and $y=r(n)r(n-1)\sin(\Delta\phi(n))$, respectively, in accordance with the principle of the optical delayed demodulation. Here, $\Delta\phi(n)=\phi(n)-\phi(n-1)$. As can be appreciated from the quadrature-phase components x and y, the n-th received symbol information and (n−1)-th received symbol information just before the n-th received symbol information coexist in the electrical received signals 110-1 and 110-2. In the present embodiment, therefore, these signals are input to the field processing unit 111 to eliminate the (n−1)-th received symbol information just before the n-th received symbol information, so that only the n-th received symbol information is extracted and output as reconstructed optical field signals 117-1 and 117-2. In the present embodiment, the reconstructed optical field signal 117-1 represents field amplitude r(n) and the reconstructed optical field signal 117-2 represents a phase angle φ(n).

In detail, the field processing unit 111 comprises a square root processor 112 for calculating the amplitude r(n)r(n−1) of the delayed demodulation signal from the electrical received signals 110-1 and 110-2, an inverse tangent circuit 113 for calculating the phase difference Δφ(n) of the delayed demodulation signals from the electrical received signals 110-1 and 110-2, a delayed divider 115 connected to the square root processor 112, and a delayed adder 116 connected to the inverse tangent circuit 113.

The delayed divider 115 outputs the reconstructed optical field signal 117-1 that represents the field amplitude r(n) of the received symbol, by eliminating the amplitude r(n−1) component of the just previous received symbol from the amplitude r(n)r(n−1). On the other hand, the delayed adder 116 outputs the reconstructed optical field signal 117-2 that represents the phase angle φ(n) of the received symbol, by eliminating the phase component φ(n−1) of the just previous received symbol from the phase difference Δφ(n).

The optical field receiver shown in the FIG. 5 can configure an optical multilevel signal receiver by connecting a multilevel symbol decision circuit for deciding bit values corresponding to the reconstructed optical field signals r(n) and φ(n) to a subsequent stage of the field processing unit 111. Further, the optical field receiver can configure the optical field receiver and the optical multilevel signal receiver capable of compensating perfectly the degradation of the signal caused by chromatic dispersion and the like, by setting the delay time and sampling time of the optical delayed demodulators 104-1 and 104-2 so as to be ½ or less of the symbol time T and by providing a compensation processor for compensating the reconstructed optical field signals with an inverse characteristic of a transfer function of the transmission line.

FIGS. 6(A) and 6(B) are views for explaining an operation timing of the optical field receiver according to the first embodiment. The A/D converters 106-1 and 106-2 convert the output signals of the balanced optical receivers 105-1 and 105-2 at a predetermined period and timing that are decided by sampling clock signals 107-1 and 107-2, respectively.

FIG. 6(A) shows a change in the electrical received signal 110-1 (x component) and the electrical received signal 110-2 (y component) that are input to the field processing unit 111. FIG. 6(B) shows a change in the reconstructed field signal 117-1 (amplitude component r) and the reconstructed field signal 117-2 (phase component φ) that are output from the field processing unit 111. Here, the received signals are sampled at timing of the center of each symbol period by conforming the frequency of the sampling clock signal to the symbol rate of the received optical multilevel signal.

The square root processor 112 cancels a cos term and a sin term by computing a square root of a square sum of the input signals x and y at the symbol period to output a signal 114-1 that represents the sum r(n)r(n−1) of amplitudes. The inverse tangent circuit 113 outputs a signal 114-2 that represents the phase difference (for example, −π<Δφ(n)≤π) of complex signals (hereinafter, referred to as "delayed demodulation signal") using the input signals x and y as quadrature-phase components by computing the inverse tangent $\tan^{-1}(y/x)$ of the input signals x and y.

These signals are input to the delayed divider 115 and the delayed adder 116. If the field processing unit 111 is normally operated, the values of the field information r(n−1) and φ(n−1) of the just previous symbol will be decided at the previous symbol period. Therefore, the amplitude r(n) of the received symbol can be calculated in the delayed divider 115, by dividing the sum r(n)r(n−1) of amplitudes output from the square root processor 112 by the amplitude r(n−1) of the just previous symbol. Also, the phase angle φ(n) of the received symbol can be calculated in the delayed adder, by adding the phase φ(n−1) of the just previous symbol to the Δφ(n) output from the inverse tangent circuit 113. As such, in the first embodiment, the optical field information representing the amplitude value and the phase angle can be extracted from the input optical signal 101 by using the optical delayed demodulation type optical receiver which is an incoherent receiver.

In FIG. 5, for the connecting between optical parts on an optical signal path 103, various connection types, such as a connection between optical parts by an optical fiber, a connection between optical parts by a bulk optical device with spatial beam, and a connection between optical parts by a waveguide between integrated optical parts can be adopted. Further, by combining the optical delayed demodulator 104 (104-1 and 104-2) and the balanced optical receiver 105 (105-1 and 105-2) as shown in FIG. 5, as the amplitude of the output signal from the demodulator is doubled, an unnecessary DC-component can be advantageously eliminated. Instead of the balanced optical receiver 105, a standard optical intensity detector may be applied.

Delay adjusting circuits 108-1 and 108-2 conform the processing timings of the x component and y component by conforming the signal propagation time into two signal paths between the optical branching circuit 102 and the field processing unit 111. For example, this can be realized by a buffer circuit. However, when a circuit configuration where the lengths of two signal paths can conform to each other in a manufacturing step is adopted, the delay adjusting circuits 108-1 and 108-2 can be omitted. Further, instead of using the delay adjusting circuits 108-1 and 108-2, the relative phase of the x component and y component can be controlled by another method, for example, by the timing of supplying the sampling clocks 107-1 and 107-2 to the A/D converters 106-1 and 106-2.

In FIG. 5, although the digital delay adjusting circuits 108-1 (108-2) are located after the A/D converters 106-1 (106-2), the circuit may be configured so that an analog delayed line is used as the delay adjusting circuit and the A/D converter 106 (106-1 and 106-2) is located after the delay adjusting circuit. Further, by omitting the A/D converter 106, a part or all of the processing functions of the field processing unit 111 can be realized by an analog circuit.

In the embodiment shown in FIG. 5, although a polar coordinates (r(n), φ(n)) processing type field processing unit 111 is used, a Cartesian coordinates (I(n), Q(n)) processing type processor can be applied as the field processing unit 111. In this case, a coordinate transformer can be used, if necessary.

The function of the field processing unit 111 can be realized by, for example, FPGA, ASIC, DSP, or a processor that can reconfigure its function. In this case, the processing procedure or method to be performed in the field processing unit 111 may include numerous kinds of variations or an approximation computation method depending on the object, which are different from the embodiment. Further, previously calculated output values may be stored in a memory in association with the different input signal values, so that the processing result is obtained in a table lookup manner in accordance with the input signal values. In the field processing unit 111, other functional circuits, for example, an automatic gain controller (AGC) for normalizing the amplitude or intensity of the signal may be installed if necessary.

If sufficient computation speed is not obtained by one field processing unit 111, for example, a field data series may be input to a packet segmenting circuit 120 as shown in FIG. 7, so that the field data series is divided into three-series of data packets (data blocks) by N data, such as 1 to N, N+1 to 2N, and 2N+1 to 3N in the order of time sequential, each data packet is processed by one of three field processing units 111-1 to 111-3 arranged in parallel, and each reconstructed field signal output from each field processing unit is assembled by a packet assembling circuit 121. When a series of field data is processed after dividing into plural series of data packets, it is necessary to adjust the optical field phase so as to be continuous in a conjunction portion of each data packet. This can be solved, for example, by holding an overlapped portion of several bits before and after the data packet and by correcting the phases of the optical field so as to conform the phases of the overlapped bits.

Second Embodiment

FIG. 8 is a second embodiment of the present invention and shows an optical multilevel signal receiver using the optical field receiver 100 shown in FIG. 5. When noise occurs in a transmission laser or an optical amplifier, these noises (for example, phase fluctuation) become a fluctuation factor of the optical field phase reconstructed in the optical field receiver. When optical multilevel signal 123 including the phase fluctuation $\theta(n)$ is received, the second embodiment can eliminate the influence of the phase fluctuation $\theta(n)$ from the reconstructed multilevel digital signal.

The received optical multilevel signal 123 is processed in the optical field receiver that includes the optical branching circuit 102, the optical delayed demodulators 104 (104-1 and 104-2), the balanced optical receivers 105 (105-1 and 105-2), the A/D converters 106 (106-1 and 106-2), the delay adjusting circuits 108 (108-1 and 108-2), and the field processing unit 111, which is the same as the configuration of FIG. 5. In the second embodiment, the reconstructed field signal 117-1 representing the amplitude component r(n) and the reconstructed field signal 117-2 representing the phase component $\phi'(n)$ subjected to the influence of the phase fluctuation $\theta(n)$ are output from the field processing unit 111. These reconstructed field signals 117-1 and 117-2 are input to a symbol decision unit 176 that does not depend on the phase fluctuation.

The symbol decision unit 176 includes a symbol decision circuit 143, a phase fluctuation estimator 174, delayed circuits 157-1 and 157-2, and a subtractor 171. The symbol decision circuit 143 is input with the reconstructed field signal 117-1 (amplitude component r(n)) and the reconstructed field signal 172 (phase component $\phi(n)$) where the phase fluctuation component $\theta(n)$ is eliminated from the reconstructed field signal 117-2 by a decision feedback to be described below, such that the symbol decision results are output as a reconstructed multilevel digital signal 144.

The operation of the symbol decision unit 176 will be described with reference to FIG. 9 (9(A) to 9(C)) in the case where the received multilevel signal 123 is a 16QAM signal.

A correct signal point of the 16QAM signal is at a position shown by a white circle in FIG. 9(A). Here, it is assumed that the optical field information of time n output from the field processing unit 111 shows a signal point shown by a black circle in FIG. 9(A). The rotation deviation occurs on the complex plane by the phase fluctuation $\theta(n)$ of the optical signal due to phase fluctuation, noise, wave distortion of laser and the like in the transmission equipment, such that the signal point observed at the receive equipment deviates from the correct signal point. According to this scheme, since it cannot decide whether the signal point observed corresponds to any symbol of the 16QAM signal, in the second embodiment, the phase fluctuation estimator 174 calculates the estimation value 175 ($\theta(n)$) of the phase fluctuation of time n from the signal point information of the past (time n−1) and eliminates the estimation value 175 ($\theta(n)$) of the phase fluctuation from the phase component $\phi'(n)$ of time n by the subtractor 171, thereby calculating the correct phase angle $\phi(n)$ 172.

The arrangement of the signal point is corrected as shown in FIG. 9(C) by eliminating the estimation value $\theta(n)$. The symbol decision circuit 143 selects the most reliable received symbol from the amplitude information r(n) and phase information $\phi(n)$ of the received signal. Briefly, in the 16QAM signal, the distance between each symbol position (white circle) and the signal point (black circle) where the received signal is shown is calculated, such that it may be decided that the symbol at the closest distance is the received symbol. The symbol decision circuit 143 outputs a 4-bit digital value, which is allotted to the received symbol in the 16QAM signal, as the reconstructed multilevel digital signal 144. In the present example, it is decided that the symbol shown by a double circle is the received symbol and the phase angle is $\phi_D(n)$ and the output digital value is "1011".

The phase fluctuation estimator 174 is input with the received signal phase $\phi'(n−1)$ before one symbol period and the phase angle $\phi_D(n−1)$ 173 decided before one symbol period via the delayed circuits 157-1 and 157-2. In this case, if the random fluctuation (a distance between the black circle and the double circle in FIG. 9(A)) of the received field due to noise is disregarded, the phase fluctuation component $\theta(n−1)$ before one symbol period can be calculated as $\theta(n−1)=\phi'(n−1)-\phi_D(n−1)$ as shown in FIG. 9(B). Actually, since the speed of change of the phase fluctuation component $\theta(n)$ is much delayed (about MHz) as compared to the symbol speed (GHz or more), the influence of random noise can be eliminated by calculating the average of a time average value of $\theta(n−1)$ over the previous N symbols (approximately, N=2 to several thousands). In other words, it is preferable that the estimation value $\phi(n)$ of the phase fluctuation is $$\theta(n)=\Sigma\{\phi'(n-k)-\phi_D(n-k)\}/N(k=1,2,\ldots N).$$

With the second embodiment, the phase of the received optical field can be calculated with high accuracy even when influence of the phase noise or optical amplifier noise of the laser occurs. In FIG. 8, although the symbol decision unit 176 which does not depend on the phase fluctuation eliminates the phase fluctuation by the decision feedback, the decision-feedback technology is applicable to the correction of the amplitude processing error and other errors. For example, the distance between the input signal point and the symbol position decided by the symbol decision unit 176 is calculated over the previous N bits period and the phase angle or the symbol amplitude is dynamically adjusted so that the average value is minimized, making it possible to maintain an optimal received state. In contrast, the receiver sensitivity can be optimally maintained by moving the symbol position which is a decision criterion according to the distribution of the input signal points, for example, dynamically meeting waveform degradation.

The method that eliminates the phase fluctuation from the reconstructed optical field signal 117-2 includes various variations other than the method shown in the second embodiment. For example, when receiving the N-level phase modulation signal, the phase modulation component (an interval between the signal points is π/N) is canceled by inputting the phase angle θ'(n) representing the reconstructed optical field signal 117-2 to an N times circuit (or, an N squared circuit inputting a phase term exp φ'(n) of the optical field), such that the phase fluctuation component can be simply estimated. When this estimation value is averaged over the previous M bit period, the averaged estimation value is subtracted from the detected phase angle φ'(n), making it possible to eliminate the fluctuation component.

Further, even when the phase modulation interval is an unequal interval like the 16QAM signal, four corner signal points where the amplitudes are at the maximum, for example, only the phase angles of "1111", "0000", "1100", and "0011" which are points shown in FIG. 1(C) are extracted and these phase angles are input to a four times circuit to be averaged, such that the phase fluctuation component can be estimated as in the above-mentioned description. When tracking the average position of the specific signal point over time, it may be estimated that the deviation quantity amount is the phase fluctuation. In order to estimate the phase fluctuation component, other known methods in the field of the wireless communication may be applied.

As described in the second embodiment, in the method sequentially calculating the optical field information, the influence of noise or processing error is accumulated, such that at the worst, the error propagation can occur for a long time. As a method for preventing error propagation, for example, encoding can be applied, such as differential encoding and the like, to the amplitude or phase and the regular insertion of the known reference code into the transmission side. Further, a method, such as the prevention of divergence or attenuation of the amplitude value due to the normalization process of the amplitude, the statistical distribution of the received signal points, or the sequential decision feedback from the specific signal point position and the like, can be applied.

In the second embodiment shown herein, although a minimum distance rule is applied to the decision of the received symbol, in the field of wireless communication, other known symbol decision methods, which are used for the multilevel signal, can be applied. For example, MLSE that first decides any one of the phase and the amplitude radius and uses the field state of the plural consecutive symbols, most likelihood decision (Viterbi decoding), soft-decision FEC (Forward Error Correction), trellis encoding/decoding process and the like, can also be applied. Further, instead of a decision of a simple square distance, for example, the non-Euclidean distance according to the noise generating factor (noise of the optical amplifier or heat noise, crosstalk, and the like) as previously defined, can be applied to the decision criterion. For example, also, the symbol decision circuit can arrange plural matched filters corresponding to each symbol in parallel and selects the filter that has maximum output, such that an analog type structure deciding the input symbol can be permitted.

FIG. 10 (10(A) to 10(D)) shows one example of an initial phase decision method that is adopted in the second embodiment. Since the amplitude information and phase information of an initial symbol are not determined, the sequentially reconstructed optical field does not necessarily match the true input optical signal. This problem can be solved by inserting a specific data pattern already known at the receiver into a head of the transmission optical signal (in an example shown in FIG. 10, 16QAM signal).

FIG. 10(A) shows the transmission optical field and FIG. 10(B) shows the symbol (signal point) arrangement of the 16QAM signal. In the symbol arrangement of FIG. 10(B), the symbols at the two corners "1111" and "0000", which are in mutually symmetrical positions, are used as the previously known data to transmit the previously known data pattern consisting of five symbols "1111", "0000", "1111", "0000", and "0000" ahead of the user information. Since these symbols are amplitude-modulated, even though the amplitude value of a first symbol is not clear, the amplitude of the reconstructed optical field becomes a constant value after a second symbol as shown in FIG. 10. Therefore, at the receive side, it is preferable to correct the reconstructed optical field intensity so that the amplitude value after the second symbol becomes a radius of the symbol "1111" and "0000" in the 16QAM signal.

During the receive period of the previously known data pattern, the phase angle π/4 of the symbol "1111" or the phase angle −3π/4 of the symbol "0000" will be ideally detected as the phase angle. Actually, however, since the phase angle of the first symbol is not determined, after the second symbol, the π/4 modulated or −3π/4 modulated phase angle appears by using the phase angle φ0 (undetermined value) of the first symbol as the initial phase. In an example described herein, during the received period of the already known data pattern, the same phase angle appears during successive 2 bits only when receiving the fourth and fifth symbols. At this time, the detected phase angle corresponds to the phase angle of the symbol "0000". Therefore, the deviation quantity (initial phase angle φ0) of the phase can be determined from the value of the phase angle detected in the fourth and fifth symbols and the phase angle π/4 inherently owned by the symbol "1111".

In other words, in the signal constellation shown in FIG. 10D, the difference φ0 between the detected phase angle of the fifth symbol shown by a black circle in the third quadrant and the normal phase angle π/4 to be owned by the symbol "1111" is calculated and the difference φ0 is then subtracted from the phase angle of the detected reconstructed optical field, making it possible to correct the detected phase angle.

As the previously known data pattern, if two symbols having an asymmetrical positional relationship, for example, such as "0000" and "0011" shown in FIG. 10(B) are used, the initial phase can be decided without the same code succeeding as the fourth and fifth symbols of FIG. 10(C).

The decision of the initial phase or the initial amplitude is a common problem in the field of optical communication and wireless communication. Therefore, the optical field receiver of the present invention can be applied with other known methods in the field of communication other than the above-mentioned methods of solution. For example, it can be permitted to use a technology, such as differential modulation, that periodically or intermittently inserts the reference signal having the previously known phase angle or the amplitude value within the transmission signal and does not require the decision of the initial phase or the initial amplitude. Further, it can be permitted to adjust the initial phase or amplitude from the statistical distribution of the reconstructed signal points in an adaptive learning way so that a normal receiver can be performed.

Third Embodiment

FIG. 11 is a third embodiment of the optical field receiver of the present invention and shows an optical multilevel signal receiver of a configuration that adds an optical intensity receiving function and a clock extraction function.

In the third embodiment, the input optical multilevel signal 123 is divided into three optical signals in the optical branching circuit 150. The first and second optical signals are input to the optical delayed demodulators 104-1 and 104-2, respectively and the third optical signal is input to the optical intensity receiver 151. The outputs of the optical delayed detectors 104-1 and 104-2 are converted into electric signals in the balanced optical receivers 105 (105-1 and 105-2), such as in FIG. 8, and then supplied to the field processing unit 111 via the A/D converters 106 (106-1 and 106-2) and the delay adjusting circuits 108 (108-1 and 108-2). The output signal of the optical intensity receiver 151 is converted into the digital signal in the A/D converter 106 and the timing of the output signal is adjusted in the delay adjusting circuit 108-3 and is then input to the field processing unit 111.

When the output signals 110-1 and 110-2 showing the quadrature-phase components x and y of the n symbol are output from the delay adjusting circuits 108-1 and 108-2, the output signal 110-3 of the delay adjusting circuit 108-3 shows a squared value $r^2(n)$ of intensity r(n) of the nth symbol. In the third embodiment, the amplitude value r(n) of the n-th symbol can be obtained by processing the square root of the output signal 110-3 from the delay adjusting circuit 108-3 in the square root circuit 160 installed in the field processing unit 111. With the above configuration, the optical field amplitude r(n) can be obtained easier and with higher precision than the optical field receiver of the first embodiment shown in FIG. 5, such that the measures against the initial estimation or error propagation of amplitude are not required.

In the embodiment shown in FIG. 11, a portion of the output signal of the optical intensity receiver 151 is input to the clock extraction circuit 161 and the clock signal of the frequency f corresponding to the reciprocal (1/T) of the symbol rate is extracted and then supplied to the A/D converters 106-1, 106-2, and 106-3. The generation timing of the clock signal is adjusted so that the A/D converter is performed to sample the input signal at the center of each symbol period. Thereby, even when a timing jitter or a fluctuation of the clock speed is in the optical multilevel signal 123, optimal signal receiving is always performed. Instead of the output of the optical intensity receiver 151, it can be permitted to supply the outputs of the balanced optical receivers 105-1 or 105-2 to the clock extraction circuit 161. Further, it can be permitted to individually install the clock extraction circuit 161 at each optical detector and it can be permitted to prepare the dedicated optical detector in the clock extraction.

Fourth Embodiment

FIG. 12 is a fourth embodiment of the present invention and shows an optical multilevel signal receiver including a decision-feedback equalizer.

In the fourth embodiment, a clock having frequency f corresponding to two times (or more) of the symbol rate (1/T) of the input optical multilevel signal 123 is generated from a clock source 191 and then supplied to the A/D converters 106-1 and 106-2 as the sampling clock signals 107-1 and 107-2. The A/D converters 106-1 and 106-2 perform sampling in response to the sampling clock regardless of the timing synchronization with the input symbol.

The outputs of the A/D converters 106-1 and 106-2 are input to resampling circuits 192-1 and 192-2 via the delay adjusting circuits 108-1 and 108-2, respectively. Each resampling circuit performs interpolation of the input data series by using the Nyquist Theorem, making it possible to reconstruct the sampling points at any timing. Herein, the resampling is performed so that the sampling points are positioned at the center of each symbol period. The sampling timing can be adjusted, for example, using a discrimination circuit of data transition points or a detector of peak points of an eye opening.

As such, when performing the sampling at a double speed of the symbol rate of the input optical multilevel signal 123, since detailed information of the field waveform can be obtained, the waveform degradation can effectively be compensated by installing a decision-feedback equalizer 193 using a feed-forward equalizer (FEE) or decision-feedback equalizer (DFE) during a processing procedure. This is the same technology as the adaptive waveform equalizer used for a high-speed wireless signal or the optical receiver. As a result, the inter-symbol interference and the waveform degradation due to the polarization mode dispersion (PMD), the chromatic dispersion, the self-phase modulation effect and the like can be partially improved. When the sampling rate is the same as the symbol rate, if the equalizer is applied, the improvement quantity is limited as compared to the double frequency sampling.

In the fourth embodiment, the coordinates of the optical field output from the field processing unit 111 are converted into Cartesian coordinates from the polar coordinates by the Cartesian coordinate converter 198 connected to the field processing unit 111, and the optical field is then supplied to the symbol decision unit 176 that does not depend on the phase fluctuation via the decision-feedback equalizer 193. The waveform equalization using the decision feedback in the decision-feedback equalizer 193 is performed by feeding back the decision-feedback signal 194 obtained from the symbol decision unit 176. Likewise in the standard waveform equalization, in the fourth embodiment, the forward error correction code (FEC) used in the known high-speed optical signal is mounted to perform the error correction of the reconstructed multilevel digital signal 144, making it possible to further improve the performance.

Fifth Embodiment

FIG. 13 is a fifth embodiment of the present invention and shows an optical multilevel signal receiver for an optical APSK signal.

The optical multilevel signal receiver of the fifth embodiment differentially detects the optical APSK signal 124 in the optical delayed demodulators 104-1 and 104-2 and inputs the output signal of the delay adjusting circuits 108-1 and 108-2 to the automatic gain controllers (AGC) 195-1 and 195-2, such that the average intensity is normalized to be constant. Even when the received intensity of the input optical signal 124 is fluctuating, the received characteristics can be stabilized by installing the AGCs 195-1 and 195-2.

The output signals x and y of the AGCs 195-1 and 195-2 are supplied in parallel to each of the square root processor 112 and the inverse tangent circuit 113 of the optical field processing unit 111. The optical field processing unit 111 outputs the first signal 117-1, in which the amplitude r(n) of the received optical field is calculated by the square root processor 112 and the delayed divider 115; and the second signal 117-2, in which the phase difference $\Delta\phi(n)$ between the symbols is calculated by the inverse tangent circuit 113 to the symbol decision circuit 143.

FIG. 14(A) shows the signal constellation of the 16-level APSK signal whose amplitude is 2-level ("1" and "a") and phase is 8-level. The APSK signal has the signal constellation of the concentric circles as shown by a dotted line. Therefore, since the APSK signal can increase the phase fluctuation tolerance by applying the differential detection to the phase component, the removal of the phase fluctuation is not required.

FIG. 14(B) is an encoding table for the differential phase modulation that shows the corresponding relationship of the value of the phase difference Δφ(n) and the three information bits of D3, D2, and D1. The symbol decision circuit 143 decodes the value of the phase difference Δφ input as the second signal by reversely using the encoding table of FIG. 14(B) simultaneously with deciding the strength and weakness of the amplitude r(n) input as the first signal 117-1.

At the transmission side, the information bit D4 is amplitude-modulated according to the encoding table for the differential amplitude modulation shown in FIG. 14(C). In other words, when the information bit D4 is "0", the amplitude of the n symbol is the same as the just previous (n−1)-th symbol and the case where the information bit D4 is "1" is the amplitude value (if the amplitude r(n−1) of the just previous symbol is "1", it is "a" and when r(n−1) is "a", it is "1") that inverts the amplitude r(n−1) of the just previous (n−1)-th symbol.

The magnitude of r(n)r(n−1) obtained at the receiver side may be three of "1", "a", and "a$^2$" as shown in the decoding table for the differential amplitude modulation of FIG. 14(D). Among them, the case where the amplitude is "a", is the only case where the n-th symbol and the just previous (n−1)-th symbol are different. Therefore, it can be decided that when the amplitude is "a", the information bit D4 is "1" and in other cases, the information bit D4 is "0". The differential detection of phase and amplitude has an effect of preventing error propagation and can be applied for receiving the APSK signal in the present invention. Even in the QAM signal, the method modulating the differential phase by 2 bits by using rotational symmetry four times is known, which can be applied to the present invention.

With the fifth embodiment, Δφ(n) calculated in the inverse tangent process is used for deciding the symbol, such that the multilevel signal having larger signal levels can be easily received as compared to the receiver described in Non-Patent Document 4. In other words, with the fifth embodiment, even though the number of signal levels of the received signal is increased, the size of the hardware is not increased. In the case of the APSK, the differential encoding is also performed on the amplitude at the transmission side, such that the delayed divider 115 can be omitted from the optical field processing unit 111 and the output signal 114-1:r(n)r(n−1) of the square root processor 112 can be directly input to the symbol decision circuit 143.

Sixth Embodiment

FIG. 15 is a sixth embodiment of the present invention and shows the optical multilevel signal receiver for an N-level optical phase modulation signal.

In the sixth embodiment, by differentially detecting an N-level optical phase modulation signal 197, the amplitude decision of the received light is not needed and the square root processor 112 and the delayed divider 115 can be omitted from the field processing unit 111 shown in FIG. 13, such that only the inverse tangent circuit 113 remains. Although not shown in FIG. 15, even in the sixth embodiment, the influence of the phase fluctuation is reduced by using the decision-feedback circuit shown in FIGS. 8 and 9, making it possible to improve the receiver sensitivity.

Although at first glance, the sixth embodiment approximates the receiver for the binary phase shift keying light according to the prior art shown in FIG. 4, in the receiver of FIG. 4, the received signal is not limited to the binary phase shift keying signal and the binary decision circuit 152, which is the symbol decision circuit, is input with cos(Δφ(n)) output from the balanced optical receiver 105-1. Therefore, the receiver according to the prior art does not generate the inter-symbol phase difference Δφ(n) on the basis of the x and y components of the complex signal output from the balanced optical receiver, and does not decide the digital value of the received symbol by the Δφ(n) value, unlike the sixth embodiment. According to the present embodiment, even when receiving the multilevel phase modulation signal of two levels or more, the digital value of the received symbol can be easily decided by using the Δφ(n) value generated in the field processing unit 111.

Seventh Embodiment

FIG. 16 is a seventh embodiment of the present invention and shows a full-fledged optical field receiver 200 receiving the whole information owned by the optical field.

The full-fledged optical field receiver 200 shown in FIG. 16 is different from the sixth embodiment and receives the whole information owned by the optical field by directly sampling the optical field of the input optical signal 101 at a double speed of the symbol rate.

When compared with the first embodiment shown in FIG. 5, the delayed quantity of optical delayed demodulators 201-1 and 201-2 becomes ½ of a symbol period T and the sampling clock signal 107 (107-1 and 107-2) input to the A/D converter 106 becomes a clock signal corresponding to two times (frequency=2/T) of the symbol rate synchronizing with the input optical signal. The operation from optical delayed demodulators 201-1 and 201-2 to the optical field processing unit 111 approximates the first embodiment. In the seventh embodiment, the compensation process on the field signals 117-1 and 117-2 output from the field processing unit 111 is performed in a field compensator 202 and field signals 203-1 and 203-2 after the compensation are used as the output of the optical multilevel signal receiver.

FIGS. 17(A) and 17(B) each show either the electrical received signals x and y (FIG. 17(A)) or the reconstructed field signal r(n) (FIG. 17(B)), and the sampling timing of φ(n). In FIGS. 17(A) and 17(B), n and n−1 are not the symbol number, but represent a sequence of a time series sample of a T/2 interval. In the seventh embodiment, since the delay time of the optical delayed demodulators 201-1 and 201-2 becomes T/2, the optical delayed demodulation is performed between the received symbols deviating from a half symbol on a time axis. As a result, as shown in FIG. 17(B), the field information can be sequentially obtained for each half symbol as the reconstructed field signal. As described above, if the field information can be obtained at an interval of T/2, the degradation of the optical field can be perfectly compensated as in the coherent optical receiver. Since the optical delayed demodulator according to the prior art is to obtain the relative phase information between the entire symbols, as in the seventh embodiment, there is no need to perform the optical delayed demodulation in the delay time difference of the symbol length or less.

FIG. 18 is a view for explaining the case where the full-fledged optical field receiver 200 according to the seventh embodiment is applied for compensating the degradation of the optical multilevel signal due to the chromatic dispersion in the transmission line.

A transmission optical field 204 from an optical multilevel signal transmitter 210 has a three-level amplitude level as in a box 501 where an amplitude eye pattern is shown. However, if it passes through an optical fiber transmission line 206, the waveform degradation according to chromatic dispersion β is induced in the optical field 204 and the amplitude eye pattern of the optical field received by the multilevel signal receiver 200 is significantly degraded as shown in a box 502. The chromatic dispersion of the transmission line 206, which is linear degradation represented by a transfer function $\exp(-j\beta\omega^2)$ has an influence on the transmission optical field 204.

The full-fledged optical field receiver 200 according to the seventh embodiment receives the transmission optical field 204 whose waveform is degraded and processes the reconstructed optical field signal 117 in the field processing unit 208. Herein, the field processing unit 208 corresponds to a circuit portion from the optical delayed demodulators 204-1 and 204-2 to the field processing unit 111 shown in FIG. 16. The sampling points of the A/D converters 106-1 and 106-2 are adjusted so that they are positioned at the center of each symbol.

The output 117 ($r(n)$ and $\phi(n)$) of the field processing unit 208 is supplied to the field compensator 202 and is compensated by the transfer function $\exp(-j\beta\omega^2)$ having an inverse characteristic to the transfer function of the transmission line 205. This compensation is a process of the frequency domain and can be realized by a processing FFT or convolution process. The field compensator 202 can dynamically change the transfer function by setting the compensation quantity β from the outside through the compensation quantity input terminal 207. As a result of the above-mentioned process, since the field signal 203 compensating the chromatic degradation is output from the field compensator 202, the decision process of the multilevel signal can be achieved at the sampling timing meeting the center of each symbol.

In principle, the above-mentioned perfect compensation can be applied to any degradation as far as the waveform degradation induced in the received signal is linear. Therefore, for example, the bandwidth limitation of the optical transmitter or the receiver, the narrow band optical filtering, the influence of the filter ripple and the like can be compensated by the field compensator 202.

In order to compensate the degradation of the above-mentioned received signal, although it is preferable to configure the field compensator 202 as the digital processor, it can be permitted to configure the field compensator 202 as FPGA or DSP or likewise other processors. Also, in the field compensator 202, in order to save power consumption or processing capability according to the degree of degradation of the received signal, a portion of the compensation process can be omitted and when the factors of the signal degradation are complicated, it can be permitted that the degree of influence selectively performs the compensation mode corresponding to the degradation factor that gives the greatest influence, and plural compensation modes can be performed redundantly.

In the seventh embodiment, although the sampling interval of the A/D converter 106 and the delay time of the optical delayed demodulator 201 (201-1 and 201-2) is ½ of the symbol length, the sampling frequency is required as two times or more of the peak frequency component of the signal from Nyquist Theorem. Therefore, when the transmission signal includes a higher speed modulation component than the symbol rate, a higher speed sampling is needed. In contrast, when an effective band of the optical field is low like a duobinary signal, the sampling rate can be reduced. However, since an optical signal subjected to RZ modulation includes an intensity modulation component of the same frequency as the symbol rate, if the sampling speed meets T/2, the intensity of the output signal can be constant in return. For this reason, when receiving the optical signal subjected to the RZ modulation, there is a need to increase the sampling speed to be slightly higher than T/2.

Even in the fourth embodiment shown in FIG. 12, although the sampling speed of the A/D converter 106 is a double of the symbol rate, in the fourth embodiment, since the output signal of the optical delayed demodulator 104 is an interfered signal with the current and the one-symbol previous field, the perfect field information cannot be obtained only by making the sampling speed fast. This problem can be solved by an interleave sampling to be described below.

Eighth Embodiment

FIG. 19 is a modified example of the above-mentioned full-fledged optical field receiver 200 and shows a configuration of an adaptive compensation type optical field receiver suitable for the compensation of the self-phase modulation effect that is a kind of the non-linear effect generated in the optical fiber. However, in order to compensate the self-phase modulation effect, since the perfect field information is not needed, it can be permitted to apply other types of optical field receivers described in the first to sixth embodiments as the adaptive compensation type.

In the eighth embodiment, an optical multilevel signal transmitter 210 sends out the 8-level APSK signal to the optical fiber. In this case, as shown in a box 511, the signal constellation of the transmission optical field 204 has a form that quaternary signal points are radially arranged on the concentric circles having the binary amplitude. As shown in the box 511, the self-phase modulation effect generated in the optical fiber transmission line 206 generates the phase rotation ($\Delta\phi(r)=ar^2$) in proportion to the intensity to the optical signal. For this reason, in the signal constellation of the optical field passing through the optical fiber, as shown by a black circle in a box 512, the signal point on an outer side concentric circle rotates further than the signal point on an inside concentric circle so that the deviations occur on the signal constellation at the inner circle and the outer circle. The self-phase modulation effect is a non-linear effect. However, the influence can be eliminated by an inverse operator $\exp(-jar(n)^2)$ by multiplying by the received signal.

As shown in a box 513, the phase rotation ($\Delta\phi(r)=ar^2$) is generated in the field signal 117 output from the field processing unit 208 of the full-fledged optical field receiver 200 by the self-phase modulation effect. In the present embodiment, among the field signals 203 output from the field compensator 202, the phase signal $\phi_i(n)$ is input to a four-times multiplication circuit 211 to extract the deviation component and inputs the deviation component to a deviation minimizing controller 212. The deviation minimizing controller 212 automatically controls the value of the compensation quantity a, which is given to a compensation quantity input terminal 207 of the field compensator 202, so as to minimize the error of the field signal after the compensation output from the field compensator 202, thereby realizing the adaptive compensation.

Since the APSK signal consists of the quaternary phase shift keying and the binary phase shift keying, when the signal constellation is normal, if the phases of each signal point are multiplied by four times in a four times multiplication circuit 211, the phase of the output signal becomes always a constant value. However, if the signal points deviate from each other by the self-phase modulation effect, the deviations occur for each symbol in the output of the four-times multiplication circuit. According to the eighth embodiment, adaptive compensation is performed so as to minimize the deviation component, such that the signal constellation of the field signal 203 output from the field compensation circuit 202 can always be modified to be optimally arranged. The signal degradation due to the self-phase modulation effect also occurs even in optical signals other than the APSK signal, such that the adaptive compensation type optical field receiver according to the present invention can be applied to other modulation schemes.

Ninth Embodiment

FIG. 20 shows the embodiment that applies the full-fledged optical field receiver 200 according to the present invention to the chromatic dispersion compensation of a binary intensity modulation signal.

The standard binary modulation is used in a state where space level optical intensity having an extinction ratio of about 10 dB is low. If the extinction ratio is about 10 dB, since the field amplitude ratio is about 3, a signal level does not cause any problem in the operation of the optical field receiver 200 of the present invention. However, when the extinction ratio is very high (for example, about 20 dB) or the optical intensity of the sampling point decreases to about zero by the waveform degradation occurring in the optical fiber transmission line, the optical field receiver 200 cannot be normally operated. In order to normally operate the optical field receiver 200 when the extinction ratio is very high, the ninth embodiment intentionally sets the spatial level to be high, thereby degrading the extinction ratio.

When transmitting the binary optical signal shown in a box 521 from the transmitter 213, the optical field 205 received by the optical field receiver 200 is significantly degraded as shown in a box 522 by means of the influence of the chromatic dispersion of the optical fiber. According to the ninth embodiment, in the field processing unit 208 of the optical field receiver 200, the sampling point of the reconstructed optical field signal 117 shown in a box 523 deviates from the center of the symbol as shown by a white circle and is set to timing of 25% and 75% of the symbol width, such that it is unlikely to make the sampled optical field intensity zero. In regards to the output signal 117 from the field processing unit 208, the field signal where the influence of the chromatic dispersion is compensated can be obtained as shown in a box 524 by processing the transfer function of the inverse characteristic to the chromatic dispersion in the field compensator 202.

Since in the signal waveform reconstructed from the field signal 203, which is output from the field compensation circuit 202, the sampling points deviate from each other, in the ninth embodiment, the amplitude signal $r_i(n)$ is input to the resampling circuit 192 and the sample value of the center of the symbol waveform is decided in the binary decision circuit 152, thereby obtaining the reconstructed binary digital signal 153. Further, in the ninth embodiment, the output of the resampling circuit 192 is branched into an eye opening detector 214 and the size of the eye opening of the signal after the field compensation is detected in the eye opening detector 214. The detection results of the eye opening are input to a controller 215 and the controller 215 controls the compensation quantity β of the field compensator 202 so that the value of the eye opening is maximized, thereby realizing the adaptive dispersion compensation.

The full-fledged optical field receiver according to the present invention functions just like the coherent receiver and can dynamically and infinitely compensate the chromatic dispersion according to the operation process by the electric circuit. As described above, the full-fledged optical field receiver according to the present invention can be applied for receiving various optical signals, such as a binary intensity modulation light other than the multilevel signal, a duobinary signal, a binary phase shift keying signal, and the like. In this case, there are advantages in that the chromatic dispersion compensator is not needed and the optical transmission distance can be remarkably expanded. In the case of the RZ modulation, although the optical signal intensity between bits is necessarily "0", in the ninth embodiment, the extinction ratio of the RZ modulation falls and the original signal waveform can be reconstructed by delaying the sampling timing.

Tenth Embodiment

FIG. 21 shows a first embodiment of a wavelength multiplexing optical transmission system to which the optical field receiver according to the present invention is applied.

A wavelength multiplexing transmission equipment 220A includes optical transmitters 226-1A to 226-3A connected to a wavelength division multiplexer 223A and an optical field receiver 200-1A to 200-3A according to the present invention connected to a wavelength division demultiplexer 224A. Further, a wavelength multiplexing transmission equipment 220B includes optical transmitters 226-1B to 226-3B connected to a wavelength division multiplexer 223B and an optical field receiver 200-1B to 200-3B according to the present invention connected to a wavelength division demultiplexer 224B.

The wavelength multiplexing transmission equipment 220A and 220B are connected to each other by an upstream optical transmission line and a downstream optical transmission line. The upstream optical transmission line includes optical fibers 206-1 to 206-3 and optical amplifiers 225-1 and 225-2 and the downstream optical transmission line includes optical fibers 206-4 to 206-6 and optical amplifiers 225-3 and 225-4.

The optical transmitters 226-1A to 226-3A of the wavelength multiplexing transmission equipment 220A transmit optical signals at each of different wavelengths λ1 to λ3. These optical signals are multiplexed in the wavelength division multiplexer 223A and then output to the upstream optical transmission line and are demultiplexed for each wavelength in the wavelength division demultiplexer 224B of the opposing optical transmission equipment 220B and are input to the optical field receivers 200-1B to 200-3B. On the other hand, the optical transmitters 226-1B to 226-3B of the wavelength multiplexing transmission equipment 220B transmits an optical signal at each of the different wavelengths λ1 to λ3. These optical signals are multiplexed in the wavelength division multiplexer 223B and are output to the downstream optical transmission line and are demultiplexed for each wavelength in the wavelength division demultiplexer 224A of the optical transmission equipment 220A and are input to the optical field receivers 200-1A and 200-3A. The multiplexed different optical wavelengths can be permitted in the upstream transmission line and the downstream optical transmission line.

The wavelength multiplexing transmission equipment 220A (220B) includes a node controller 221A (221B) and a database 222A (222B). Although the optical transmitters 226-1A to 226-3A (226-1B to 226-3B) and the optical field receivers 200-1A to 200-3A (200-1B to 200-3B) receive the transmission data from the outside and output the received data to the outside, this is omitted in the drawings. The data base 222A (222B) stores a data table showing the chromatic dispersion quantity of each optical fiber that forms the optical transmission line corresponding to the received wavelengths λ1 to λ3.

FIG. 22 shows a flow chart of a routine of a compensation quantity setting table that is performed in the node controller 221A (221B). The routine is performed when starting and resetting the wavelength multiplexing transmission equipment or resetting the transmitter and receiver 226 (226-1A to 226-3A and 226-1B to 226-3B) and 200 (200-1A to 200-3A and 200-1B to 200-3B).

The node controller 221A reads the chromatic dispersion quantity data table from the database 222A and sets parameter i for specifying a wavelength channel to an initial value "1" (step 601). The node controller 221A checks the parameter i value (step 602) and when the parameter i exceeds the channel number N (N=3 in FIG. 21) that is multiplexed in the optical fiber transmission line ends this routine.

When the parameter i is N or less, the node controller 221A calculates a total of chromatic dispersion quantity $D_i$ of the whole optical fiber along the received optical transmission line (a downstream optical transmission line in the case of the node controller 221A) from the chromatic dispersion quantity of each optical fiber corresponding to the wavelength λi of an i channel shown by the chromatic dispersion quantity data table (step 603). Thereafter, the compensation quantity "$-D_i$" is set in a terminal 207 of the optical field receiver 200-iA of the i channel (wavelength λi) to start the optical field receiver 200-iA. The node controller 221A increments the parameter i value to (i=i+1) so that steps 602 to 604 are repeated until the parameter exceeds the multiplexed channel number N.

According to the tenth embodiment, the optical field receivers 200-1A to 200-3A do not need the adaptive control because they can estimate the chromatic dispersion compensation quantity from starting with high precision. In contrast, even when the adaptive control is used, the optical field receivers can be transited to an optimal control state in a short time and can prevent the malfunction.

Eleventh Embodiment

FIG. 23 shows one embodiment of an optical network that includes plural optical add-drop multiplexers (ADMs) 230-1 to 230-4 using the optical field receiver according to the present invention. The optical add-drop multiplexers 230-1 to 230-4 are connected in a ring shape in the optical fiber transmission lines 206-1 to 206-4.

In the optical network using the optical add-drop multiplexer or the optical cross-connect, the optical signal path may be dynamically changed. In the eleventh embodiment, when the optical signal path is changed, the dispersion compensation quantity in the optical receiver 200 receiving the influence of the path change is optimized by the control console 231 connected to the optical add-drop multiplexer 230-1. Reference numeral 222 is a database 222 that records the chromatic dispersion value for each wavelength over the whole optical fiber configuring the network. When the optical signal path is changed, the control console 231 accesses the database 222 to calculate a total of the chromatic dispersion value according to a new optical signal path and the used wavelength and delivers a total of the calculated chromatic dispersion value as the chromatic compensation quantity to the optical receiver 200 (200-1 to 200-3) connected to the optical add-drop multiplexers 230-2 to 230-4 that is an end of the new path via a network.

For example, in FIG. 23, the optical signal of wavelength λ3 output from the optical field receiver 200-3 is input to the optical add-drop multiplexer 230-4 and reaches the optical field receiver 200-3, which is connected to the optical add-drop multiplexer 230-3, through three optical fiber transmission lines 206-1 to 206-3 along the optical path 232-3. When the optical path 232-3 is a new path, the control console 231 reads the chromatic dispersion quantity of the optical fiber transmission lines 206-1 to 206-3 corresponding to the wavelength λ3 from the database 222 and informs the optical field receiver 200-3 at the communication path 233-3 shown by a dotted line of the setting signal of the decided compensation quantity from the sum of the chromatic dispersion quantity. The compensation quantity setting signal is input to the compensation quantity setting terminal 207-3, such that the optimal dispersion compensation value is set to the field compensator 202 of the optical field receiver 200-3.

According to the eleventh embodiment, even when the optical path is switched on the optical network, since the optimal compensation quantity can be instantly set to the optical field receiver 200-3 that is an end of the optical path from the control console, the stop time of communication can remarkably be reduced. When the precision of the dispersion compensation value set from the control console is not sufficient, as explained in the tenth embodiment, it can be permitted to optimize the value as the initial value by the adaptive control.

Twelfth Embodiment

FIG. 24 shows another embodiment of the optical multilevel signal receiver to which the optical field receiver according to the present invention is applied.

In the twelfth embodiment, the optical delayed demodulators 201-1 and 201-2 of the full-fledged optical field receiver described in FIG. 16 receive the optical multilevel signal 123 and the output of the field processing unit 111 is input to the field compensator 202 which inputs the field signals 203-1 and 203-2 after the field compensation to the symbol decision circuit 176 that does not depend on the phase fluctuation to eliminate the phase fluctuation component and perform the symbol decision of the multilevel signal. As described above, the symbol decision circuit or the equalizer, such as FFE, DFE and the like, the error correction circuit and the like are connected to the subsequent stage of the optical field receiver, making it possible to configure the high-function optical multilevel modulation signal receiver.

Thirteenth Embodiment

FIG. 25 shows another embodiment of the optical multilevel signal receiver to which the optical field receiver according to the present invention is applied.

In the thirteenth embodiment, among the output signals from the field compensator 202 of the full-fledged optical field receiver shown in FIG. 16, the signal 203-1 showing the amplitude component $r_i(n)$ is directly input to the symbol decision circuit 176 that does not depend on the phase fluctuation and the signal 203-2 showing the phase component $\phi_i(n)$ is input to a delayed demodulator 234 of the electric region to supply the differential phase signal $\Delta\phi_i(n)$ output from the delayed demodulator 234 to the symbol decision circuit 176 that does not depend on the phase fluctuation. Thereby removing the phase fluctuation component and performing the symbol decision on the multilevel signal.

In order to perfectly perform the dispersion compensation in the field compensator 202, there is a need to previously reconstruct the whole optical field information r(n), φ(n) in the field processing unit 111 of the previous stage. However, when the signal to which the delayed demodulation can be applied as in the APSK signal is used as the received signal, among the field signals subjected to the compensation in the field compensator 202, the phase component $\phi_i(n)$ is input to the delayed demodulator 234 of the electric region to calculate the differential phase signal $\Delta\phi_i(n)$ and apply the calculated differential phase signal to the symbol decision, making it possible to eliminate the influence of the phase fluctuation.

Fourteenth Embodiment

FIG. 26 is a fourteenth embodiment of the present invention and shows an optical multilevel signal receiver to which an interleave sampling is applied. In the fourteenth embodiment, in the optical multilevel signal receiver of the second embodiment shown in FIG. 8, instead of the optical delayed demodulators 104-1 and 104-2, optical delayed demodulators 244-1 and 244-2 of delayed quantity 3T are used and each of three A/D converters 106-1A to 106-3A and 106-1B to 106-3B is connected to the balanced optical receivers 105-1 and 105-2 to input three pairs of A/D converting outputs "x1, y1", "x2, y2", and "x3, y3", which are symmetrical with each other, to the field processing units 111-1 to 111-3, respectively. The outputs signals 117-1 to 117-3 of the field processing units 111-1 to 111-3 are input to each of the symbol decision circuits 176-1 to 176-3 that do not depend on the phase fluctuation. The circuit speed required for the symbol decision can be reduced ⅓ by performing the interleave operation of the three symbol decision circuits.

Reference numeral 240 is a division clock source that generates a clock whose frequency is ⅓T in synchronization with the received symbol timing and uses the delayed circuit 157 of the delay time T and 2T, thereby generating a three-phase clock signal series having the phase difference of the symbol time T. The three pairs of A/D converters 106-iA and 106-iB (i=1 to 3) use these three-phase clock signals as the sampling clocks to digitize the output signals of the balanced optical receivers 105-1 and 105-2.

As a result, the delayed demodulation signals output from the balanced optical receivers 105-1 and 105-2 are interleaved and sampled into three series on a time axis in these three pairs of A/D converters as shown in a black circle, a double circle, and a white circle in FIG. 27. In this case, since the delay time of the optical delayed demodulators 244-1 and 244-2 is 3T, the field processing units 111-1 to 111-3 can perform the reconstructed process of the optical field independently from each other. The reconstructed optical field signals 117-1 to 117-3 perform the removal of the phase fluctuation and the symbol decision by the individual symbol decision circuits 176-1 to 176-3. Three-series digital signals output from the symbol decision circuits 176-1 to 176-3 are multiplexed in the multiplexing circuit 243 and are output as the reconstructed multilevel digital signal 144.

In the above configuration, three-series signal points (a black circle, a double circle, a white circle of FIG. 27) interleaved on the time axis are individually processed in the field processing units 111-1 to 111-3, such that they are supplied to the symbol decision circuits 176-1 and 176-3 without being correlated with each other, making it possible to generate errors in the phase or amplitude.

In the fourteenth embodiment, the reconstructed optical field signals 117-1 to 117-3 are branched into the field synchronization circuit 241 and an average amplitude and an average phase of the same signal point are compared with each other and the difference is supplied to the symbol decision circuits 176-1 to 176-3 as a correction signal 242. Each symbol decision circuit 176-1 to 176-3 performs a normalization of the input signal amplitude and a correction of the reference phase so that the amplitudes and reference phases of the three-series output signal always conform to each other according to the correction signal. Instead of imparting the correction signal 242 to the symbol decision circuits 176-1 to 176-3, the correction signal 242 may be supplied to the field processing units 111-1 to 111-3 such that the each field processing units 111-1 to 111-3 can be permitted to correct each output signal (reconstructed optical field signal) 117-1 to 117-3.

In the fourteenth embodiment, the interleave number or the sampling speed can be optionally selected. For example, when an interleave sampling of the interleave number 2 is performed in the full-fledged optical field receiver 200 shown in FIG. 16, it can be permitted to make the delay time of the optical delayed demodulators 201-1 and 201-2 T and to make the sampling speed 1/T.

As can be appreciated from the above embodiments, since the optical field receiver of the present invention uses the optical delayed demodulator, it does not depend on the polarization state of the input light and does not need the local laser. Since the optical multilevel receiver shown in the embodiment can directly reconstruct the two-dimensional coordinate information of the optical signal points in the field processing unit that processes the output signal of the optical delayed demodulator, the multilevel symbols can be decided in a lump in the symbol decision circuit connected to the field processing unit and the optical multilevel receiver having a large multilevel number, such as 32 levels, 64 levels of high transmission efficiency and the like, can be realized by a relative small hardware.

Further, in the present invention, since the field processing or the multilevel decision can be performed by the electric digital circuit, the adaptive receiver according to the degradation factors, such as the loss of the transmission line, the SN ratio of the signal and the like can be easily realized. When the field compensator is connected to the optical field receiver, the adaptive dispersion compensation, which can perfectly compensate theoretically the linear transmission degradation, such as the chromatic dispersion or the narrow-band filtering and the like, and dynamically change the compensation contents, can be realized. In addition to a receiver for optical fiber communication, the present invention can also be applied to optical field waveform measuring equipment or optical spatial transmission equipment and the like, for example.

The multilevel signal transmission in the wireless communication field and the optical communication field to which the present invention is applied are different in the technology as described below.

(1) The receiver of the wireless communication field generally uses the local oscillator and has a configuration that coherently receives the quadrature-phase component of the input field. This corresponds to the coherent optical transmission scheme shown in FIG. 2 in the specification. Since the field of wireless communication is different from the optical communication field and does not have the problems of the polarization dependency of the received signal or the costs of the local laser, the coherent field receivers can be relatively simply configured. The present invention can obtain the same effect as the coherent detection by using the optical delayed demodulator without using the local laser and is different from the receiver of the wireless communication field in view of the problem to be solved.

(2) Even in the wireless communication field, the delayed demodulator is used. However, in the wireless communication field, the baseband signal is generated by the coherent quadrature demodulation using the local laser and the delayed demodulation is generally applied to the baseband signal. The optical delayed demodulation of the present invention is applied to the complex optical signal in which the quadrature separation cannot be performed and is different from the delayed demodulation in the wireless communication in view of the action.

INDUSTRIAL APPLICABILITY

The present invention can be applied to a multilevel modulation signal receiver of high transmission efficiency in the optical communication field.

BRIEF DESCRIPTION OF THE DRAWINGS

FIG. 2(A) is a configuration view showing one example of a coherent optical field receiver according to the prior art;

FIG. 2(B) is a view showing the influence of phase fluctuation;

FIG. 3(A) is a view showing signal constellation of a 8-level amplitude and phase shift keying (APSK) signal;

FIG. 3(B) is a configuration view of an optical multilevel signal receiver for receiving an 8APSK signal according to the prior art;

FIGS. 6(A) and 6(B) are views showing a change in an electrical received signal A and the reconstructed field signal B according to the first embodiment.

FIGS. 9(A) to 9(C) are views for explaining a principle of a removal of phase noise by a decision feedback according to the second embodiment;

FIGS. 17(A) and 17(B) are views for explaining a principle of chromatic dispersion compensation according to a seventh embodiment;

EXPLANATION OF REFERENCE NUMERALS AND SYMBOLS

Figure 1:
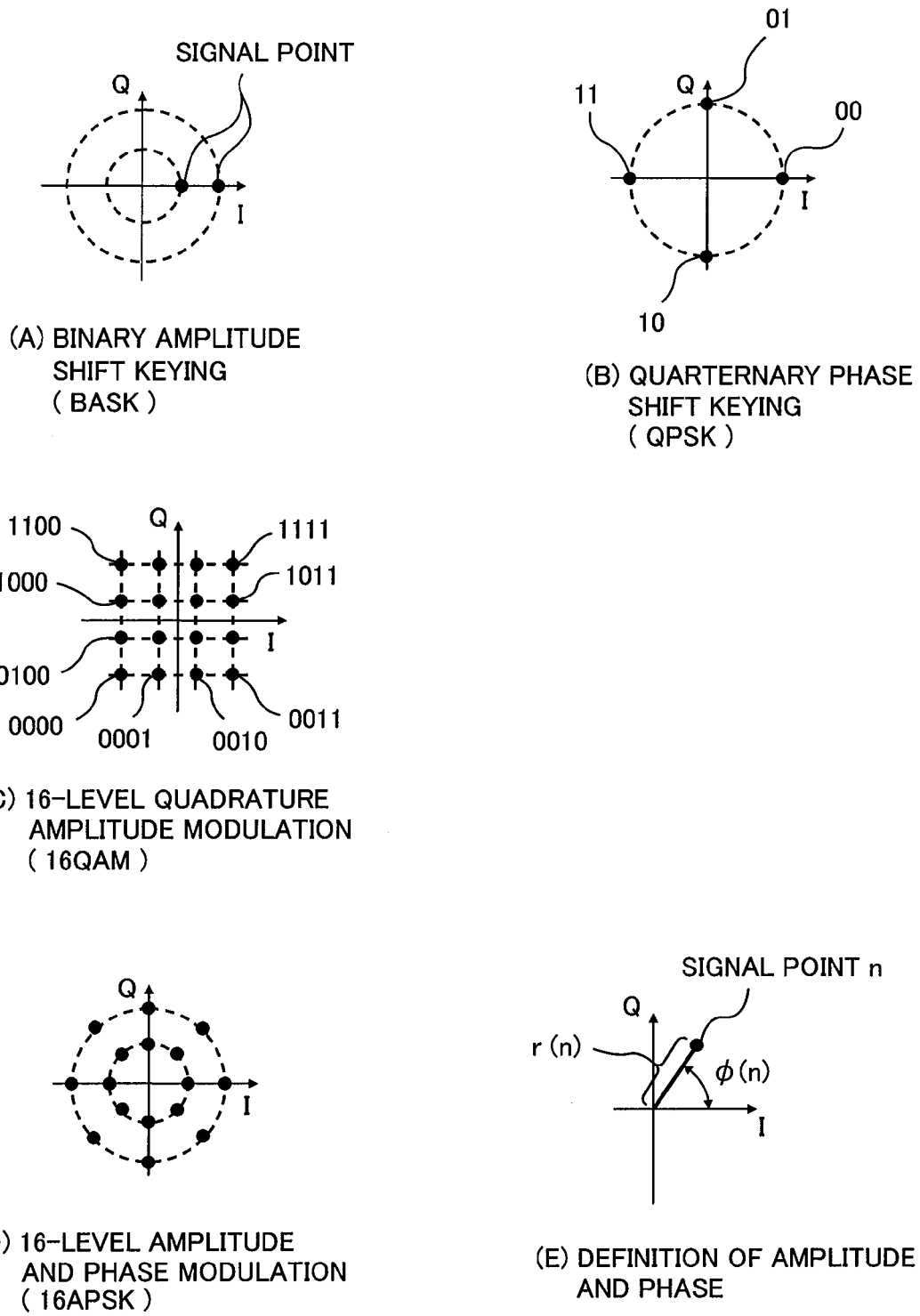
FIGS. 1(A) to 1(E) are views for explaining modulation schemes that can be applied to optical transmission.
Figure 4:
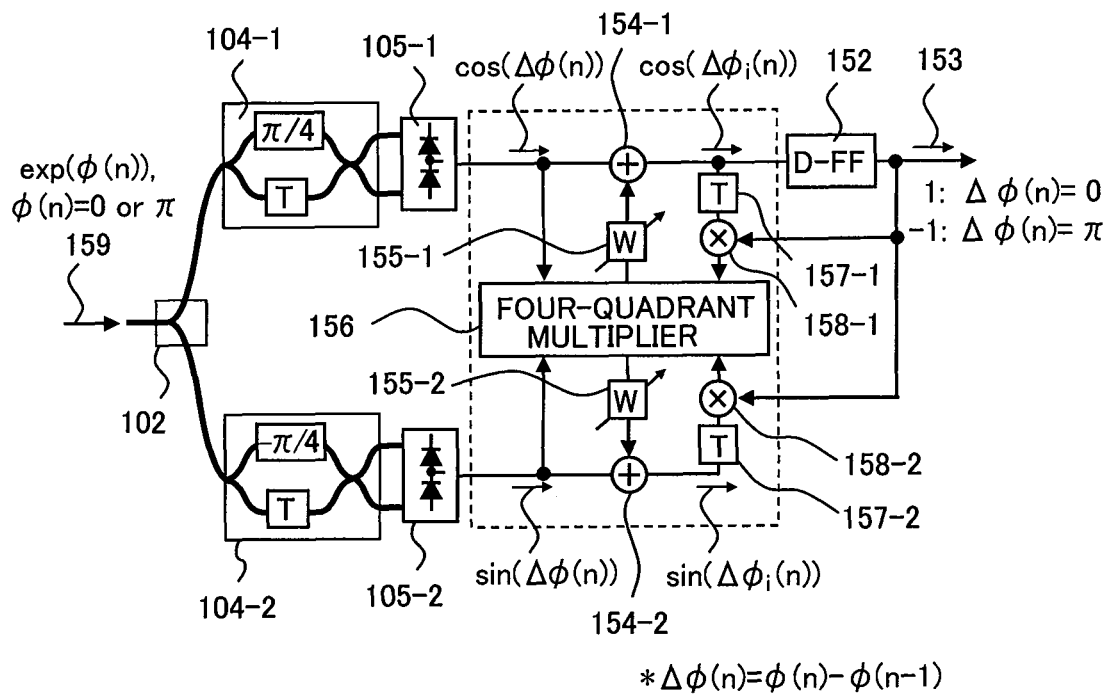
FIG. 4 is a configuration view showing one example of a decision-feedback type binary phase shift keying optical receiver according to the prior art.
Figure 5:
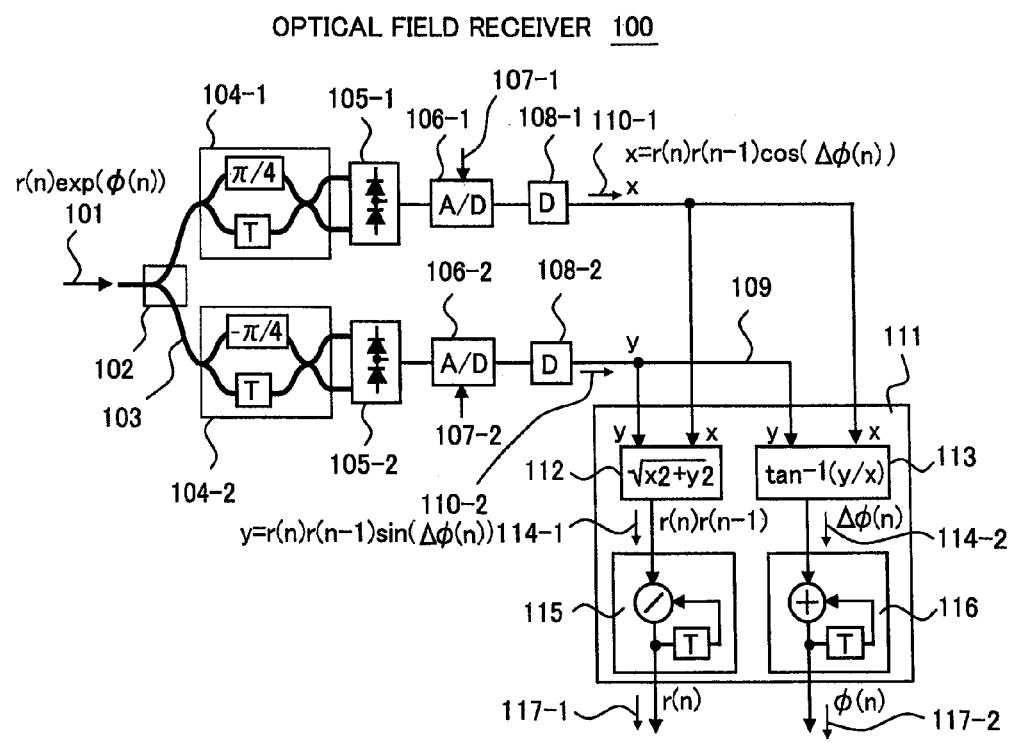
FIG. 5 is a configuration view showing a first embodiment of an optical field receiver according to the present invention.
Figure 7:
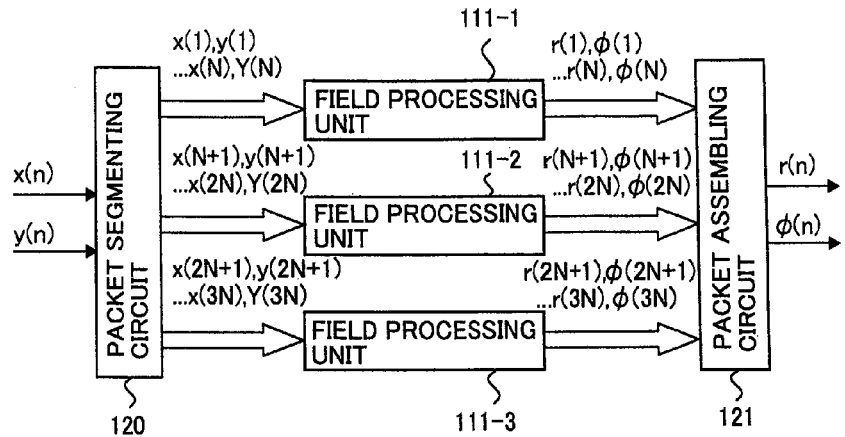
FIG. 7 is a configuration view of a case of parallelizing a field processing unit 111 according to the first embodiment.
Figure 8:
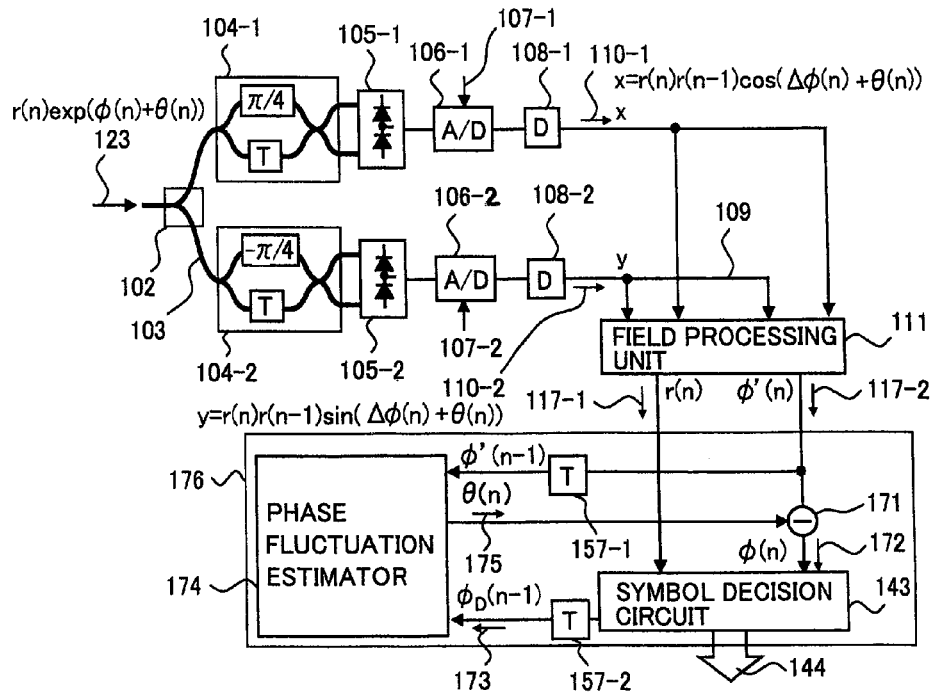
FIG. 8 is a configuration view of an optical multilevel signal receiver showing a second embodiment of the optical field receiver according to the present invention.
Figure 10:
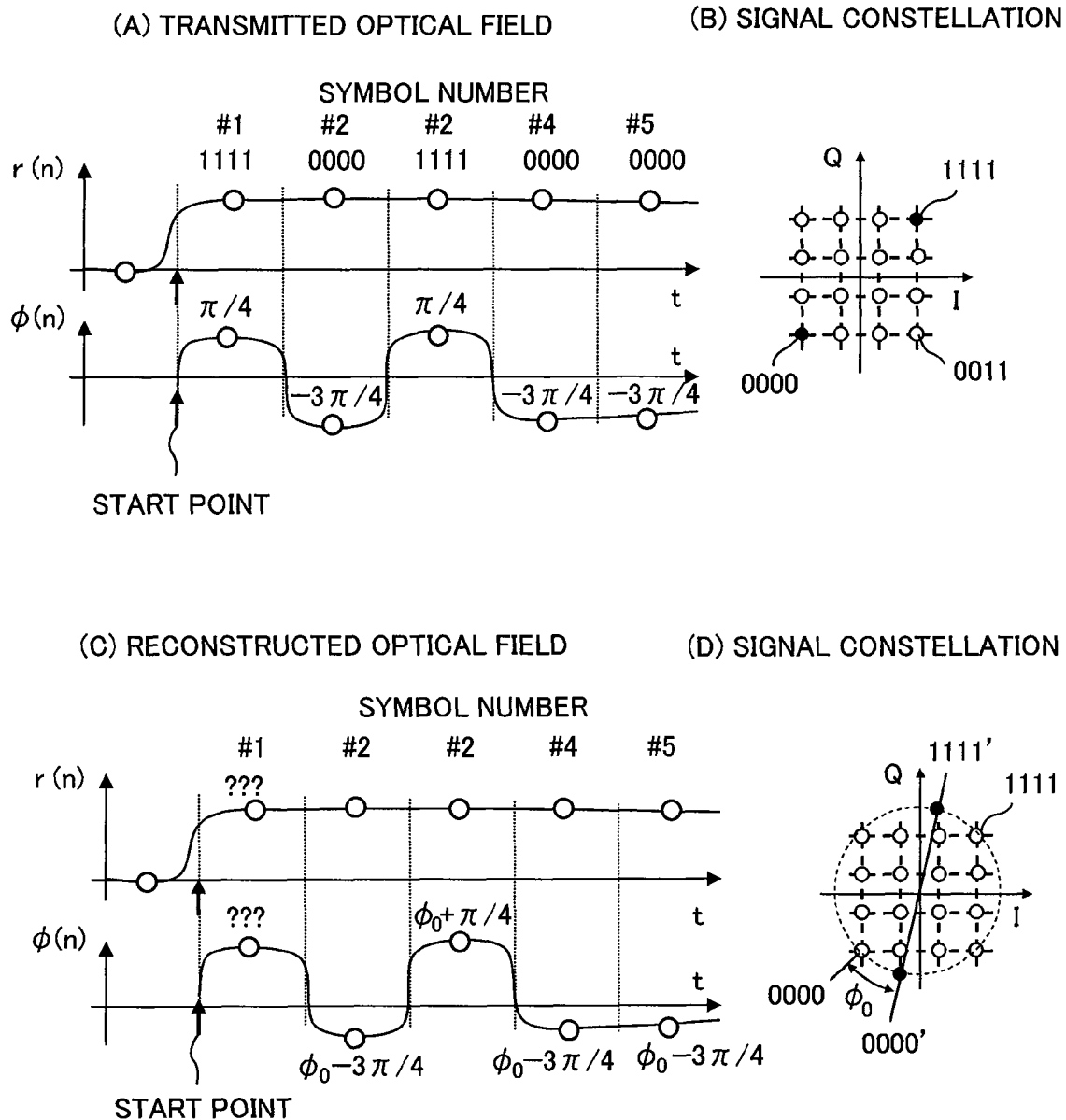
FIGS. 10(A) to 10(D) are views for explaining an initial phase decision method adopted in the second embodiment.
Figure 11:
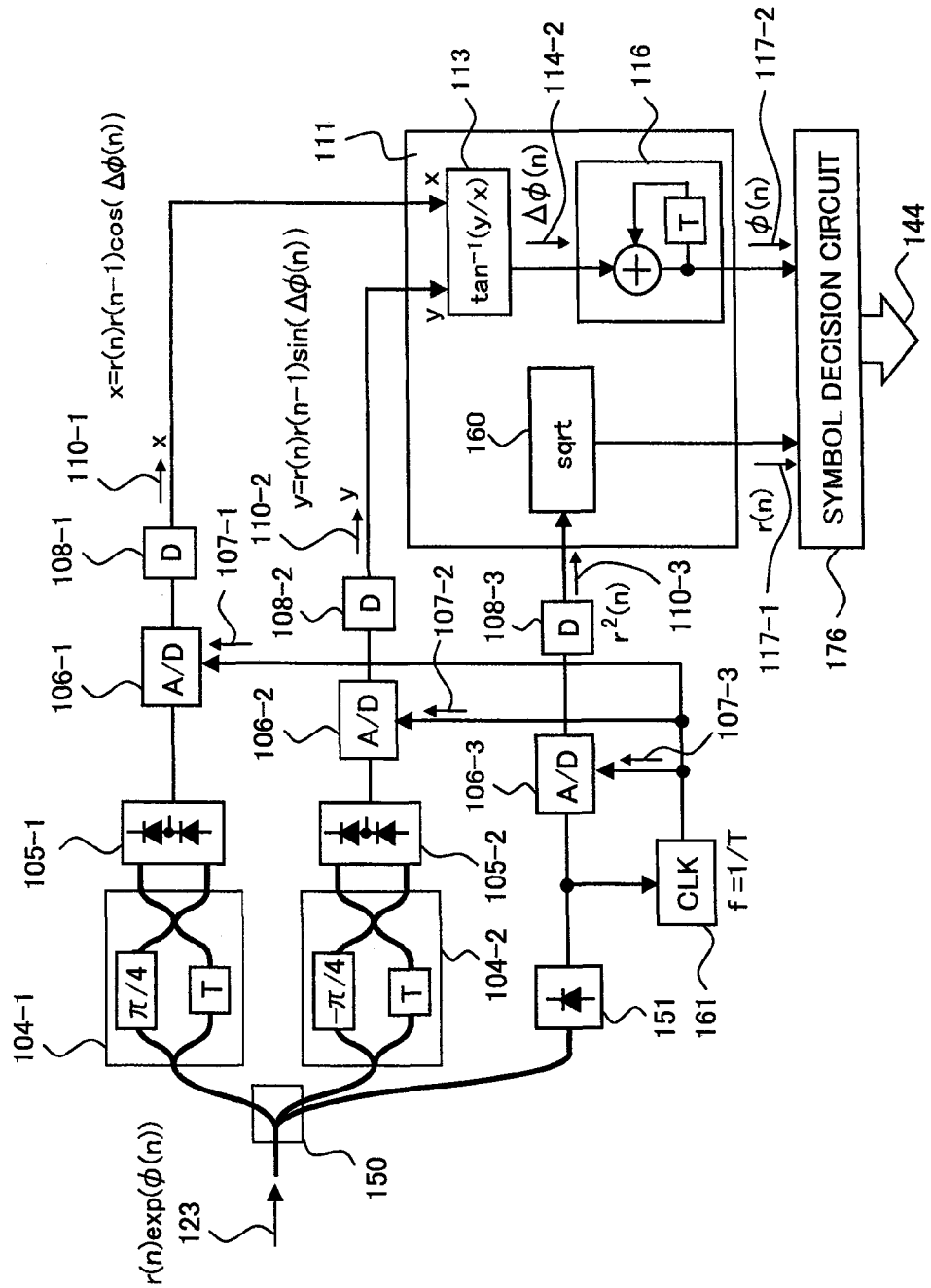
FIG. 11 is a configuration view of the optical multilevel signal receiver showing a third embodiment of the optical field receiver according to the present invention.
Figure 12:
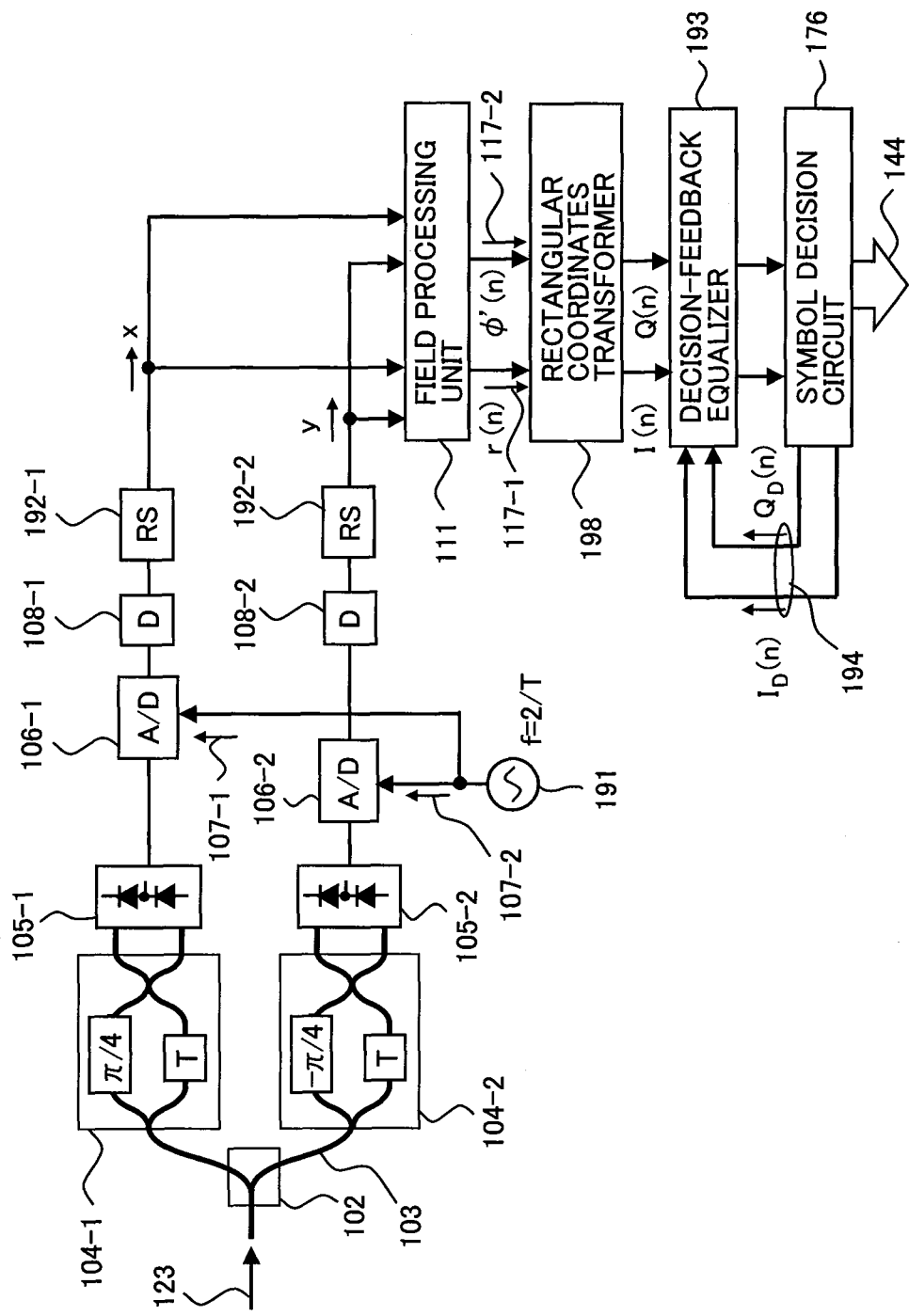
FIG. 12 is a configuration view of an optical multilevel signal receiver showing a fourth embodiment of the optical field receiver according to the present invention.
Figure 13:
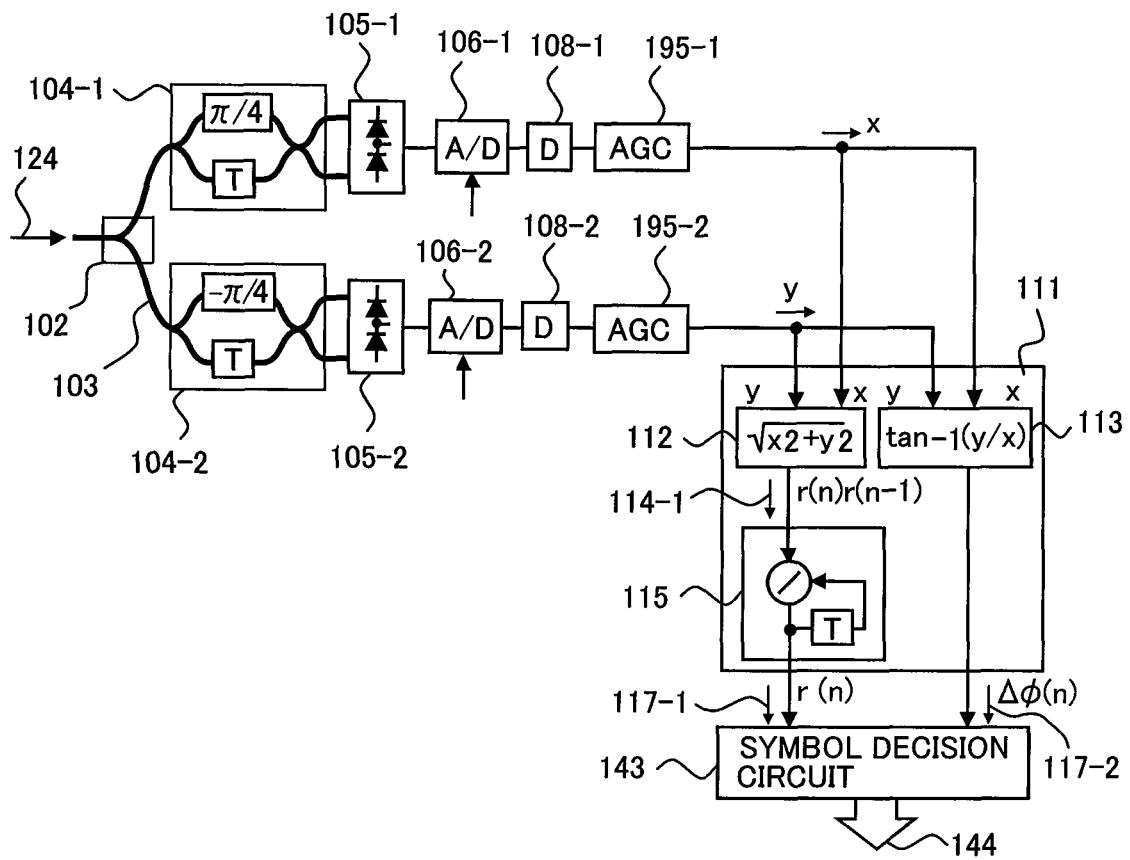
FIG. 13 is a configuration view of an optical APSK signal receiver showing a fifth embodiment of the optical field receiver according to the present invention.
Figure 14:
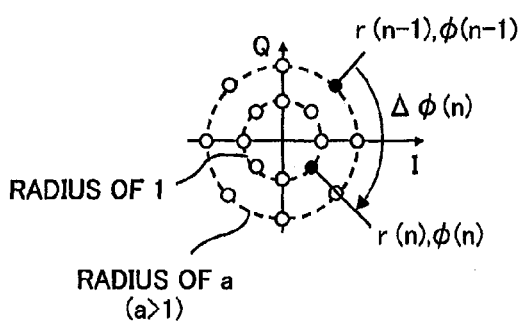
FIGS. 14(A) to 14(B) are views for explaining a differential signal of the optical APSK signal.
Figure 15:
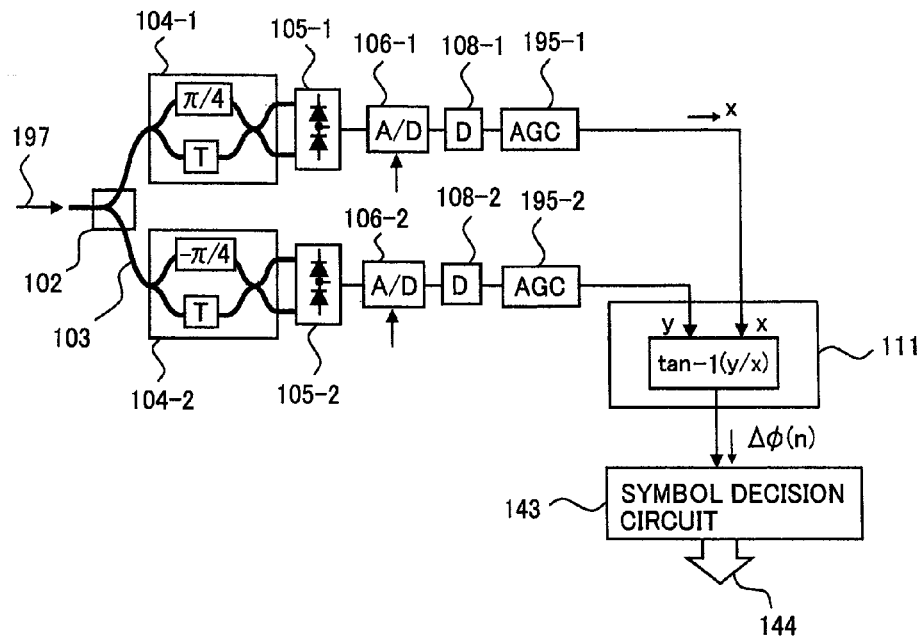
FIG. 15 is a configuration view of a principle of an optical signal receiver for an N-level optical phase shift keying signal showing a sixth embodiment of the optical field receiver according to the present invention.
Figure 16:
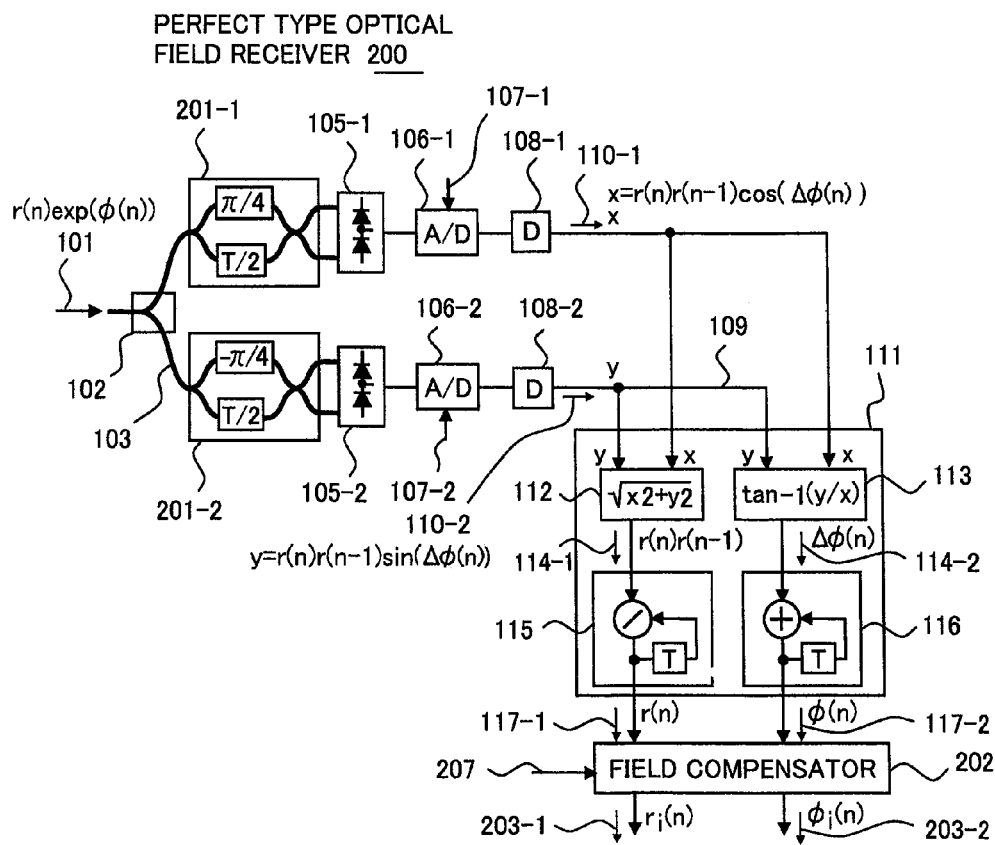
FIG. 16 is a configuration view of a full-fledged optical field receiver showing a seventh embodiment of the optical field receiver according to the present invention.
Figure 18:
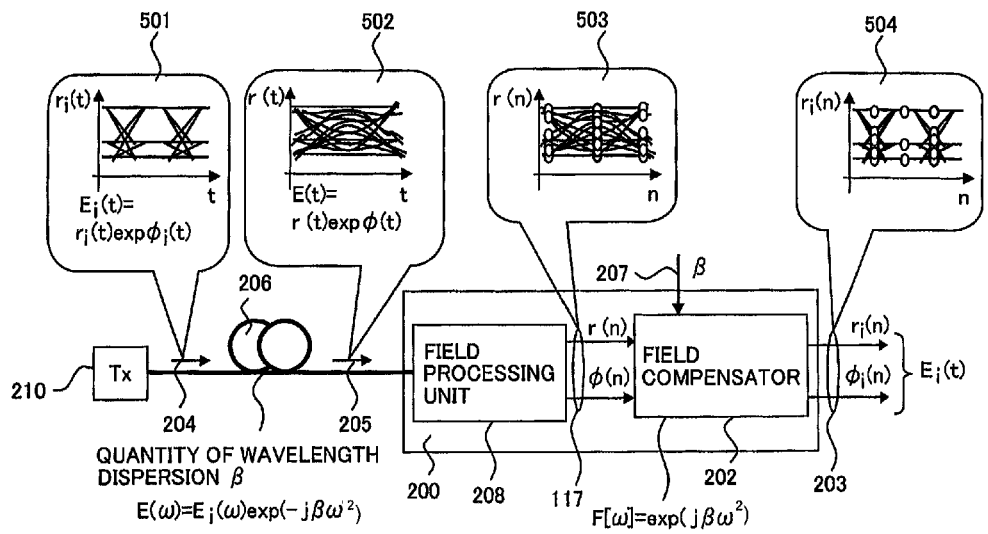
FIG. 18 is a view for explaining the chromatic dispersion compensation according to the optical field receiver of the seventh embodiment.
Figure 19:
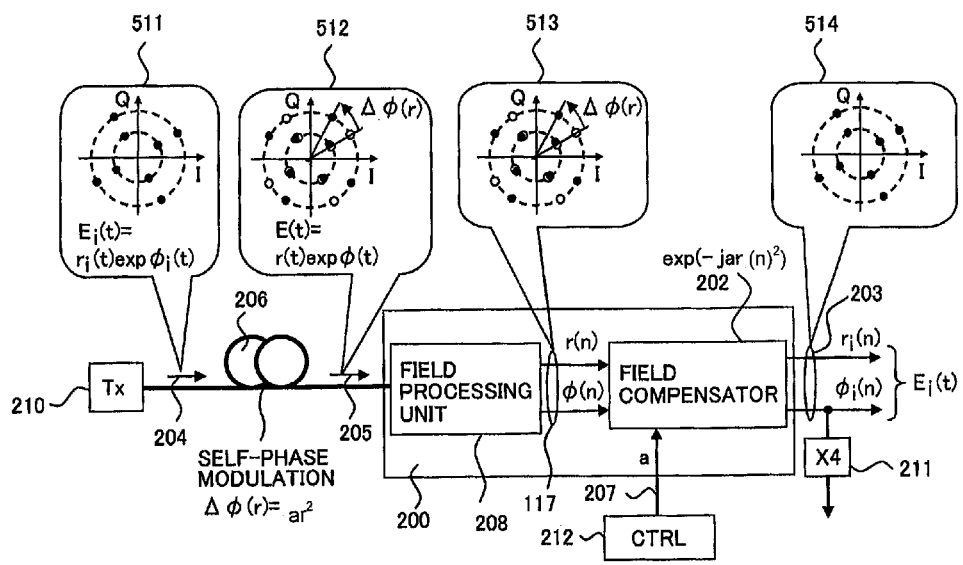
FIG. 19 is a configuration view of an adaptive compensation type optical field receiver showing an eighth embodiment of the optical field receiver according to the present invention.
Figure 20:
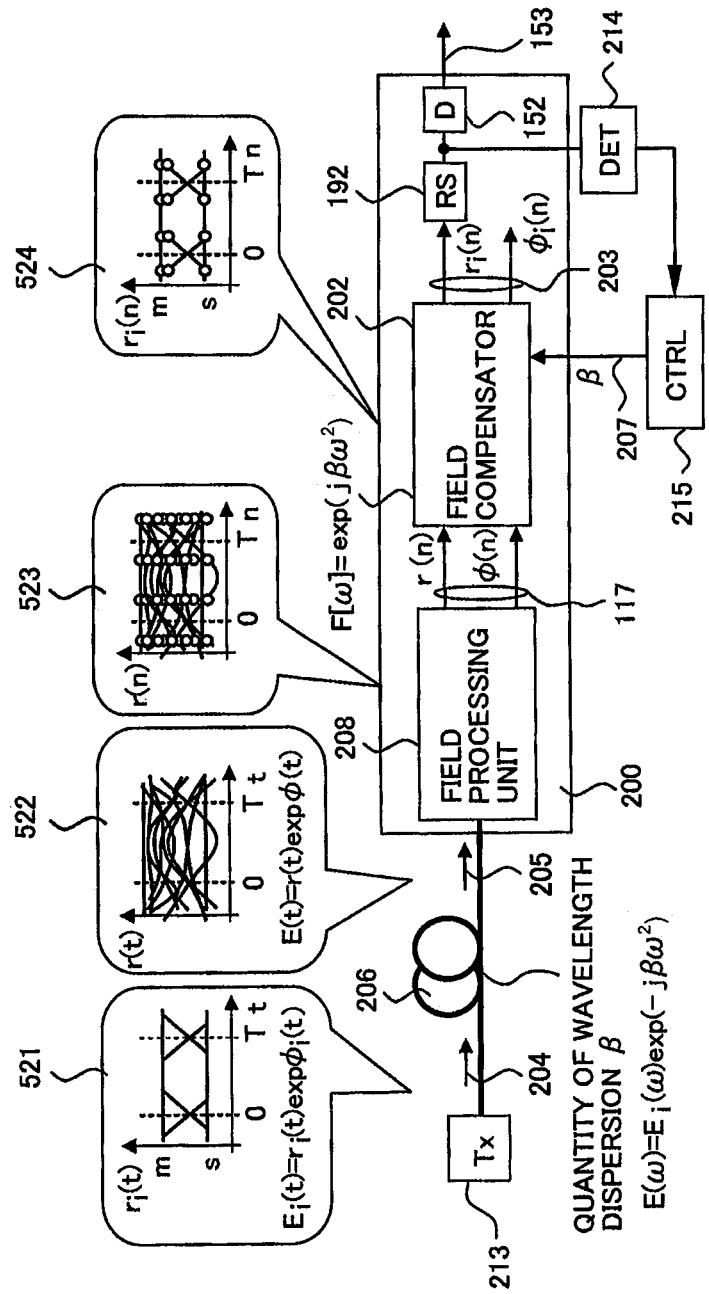
FIG. 20 is a configuration view of an optical field receiver for a binary intensity modulation signal showing a ninth embodiment of the optical field receiver according to the present invention.
Figure 21:
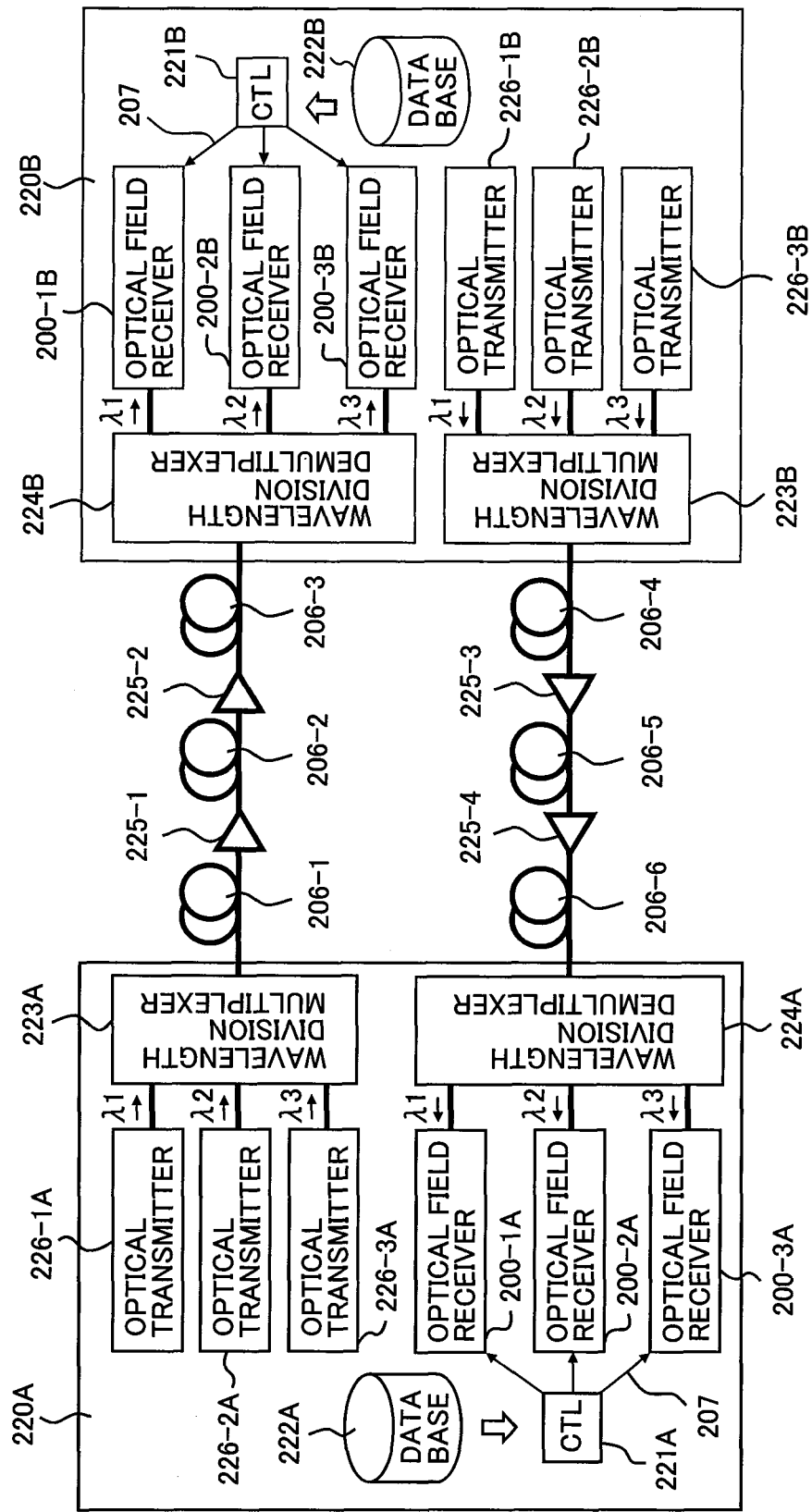
FIG. 21 is a configuration view of a wavelength multiplexing optical transmission system showing a tenth embodiment of the optical field receiver according to the present invention.
Figure 22:
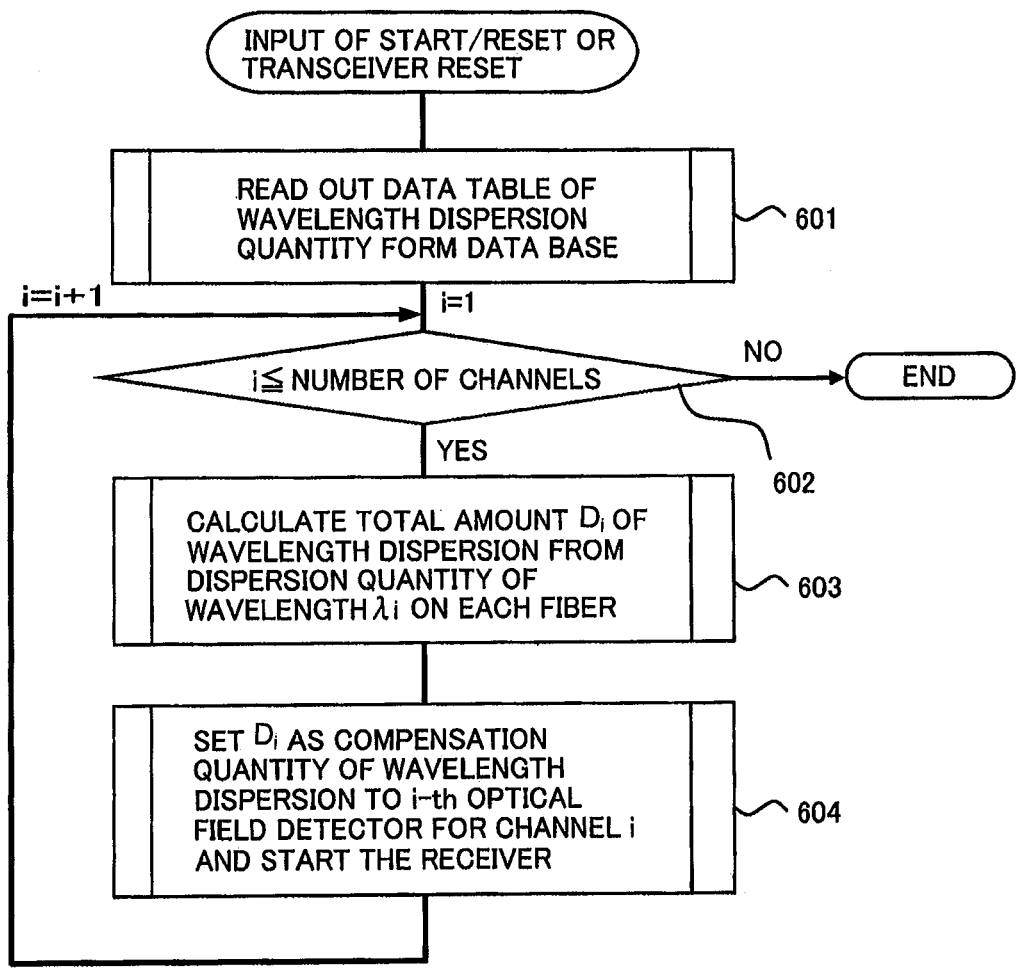
FIG. 22 is a flow chart of a compensation quantity setting routine that is performed by a local controller according to the tenth embodiment.
Figure 23:
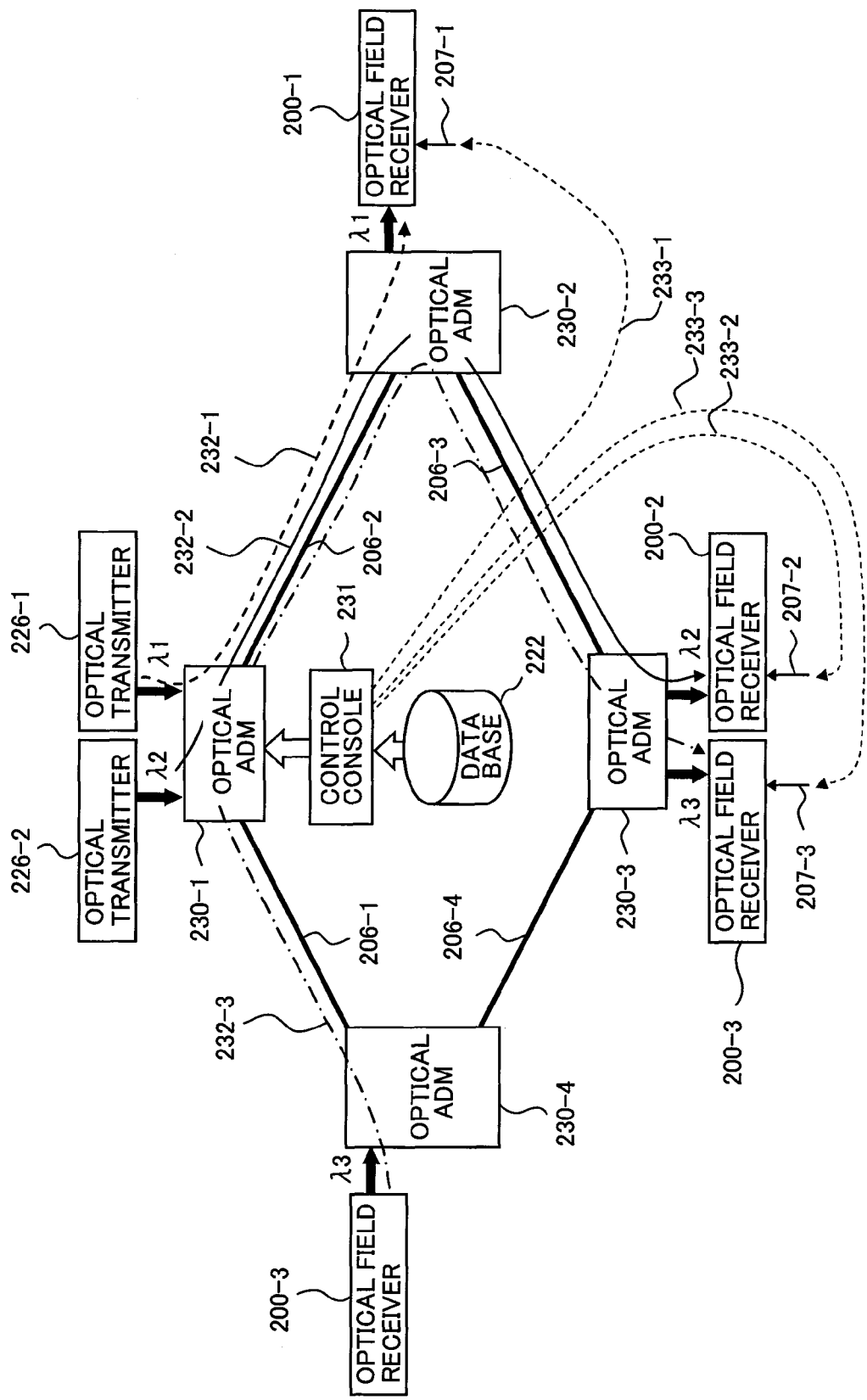
FIG. 23 is a configuration view of an optical network consisting of plural ADMs showing an eleventh embodiment of the optical field receiver according to the present invention.
Figure 24:
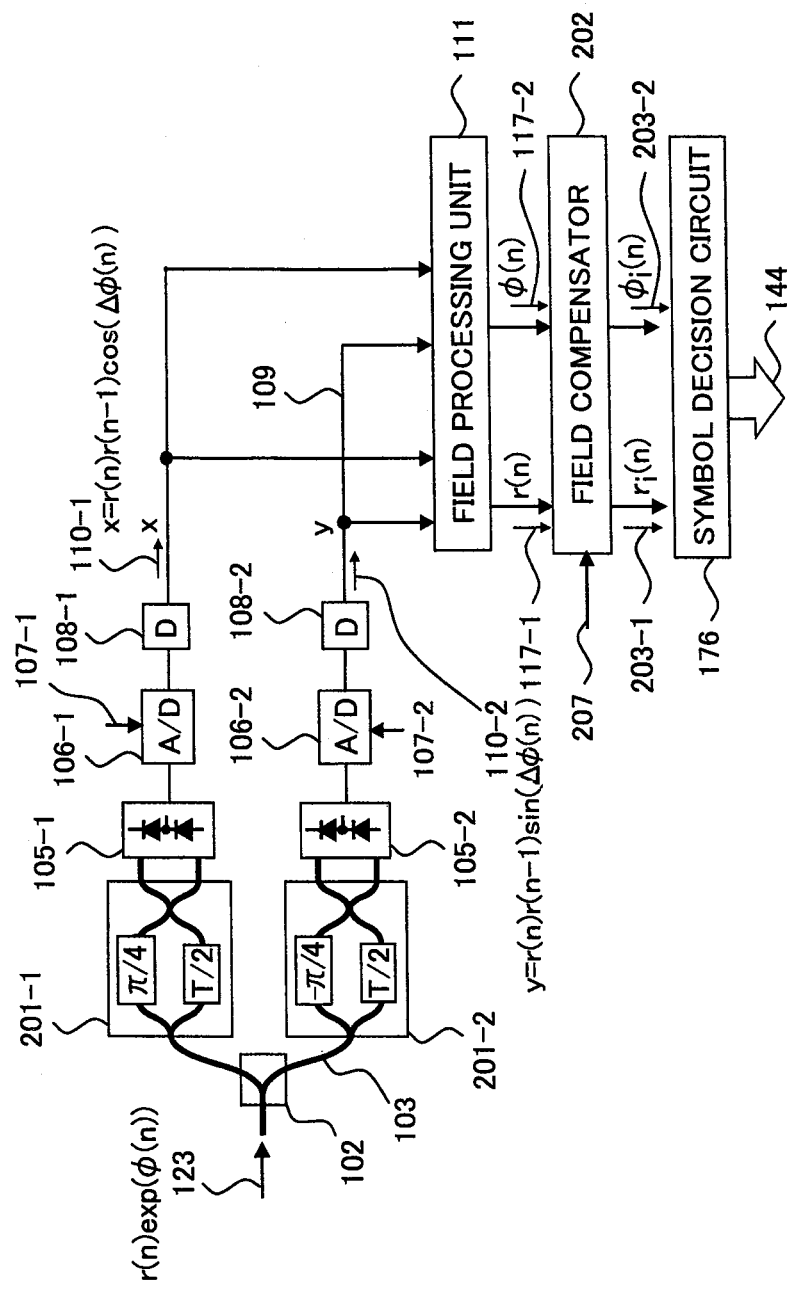
FIG. 24 is a configuration view of an optical multilevel signal receiver showing a twelfth embodiment of the optical field receiver according to the present invention.
Figure 25:
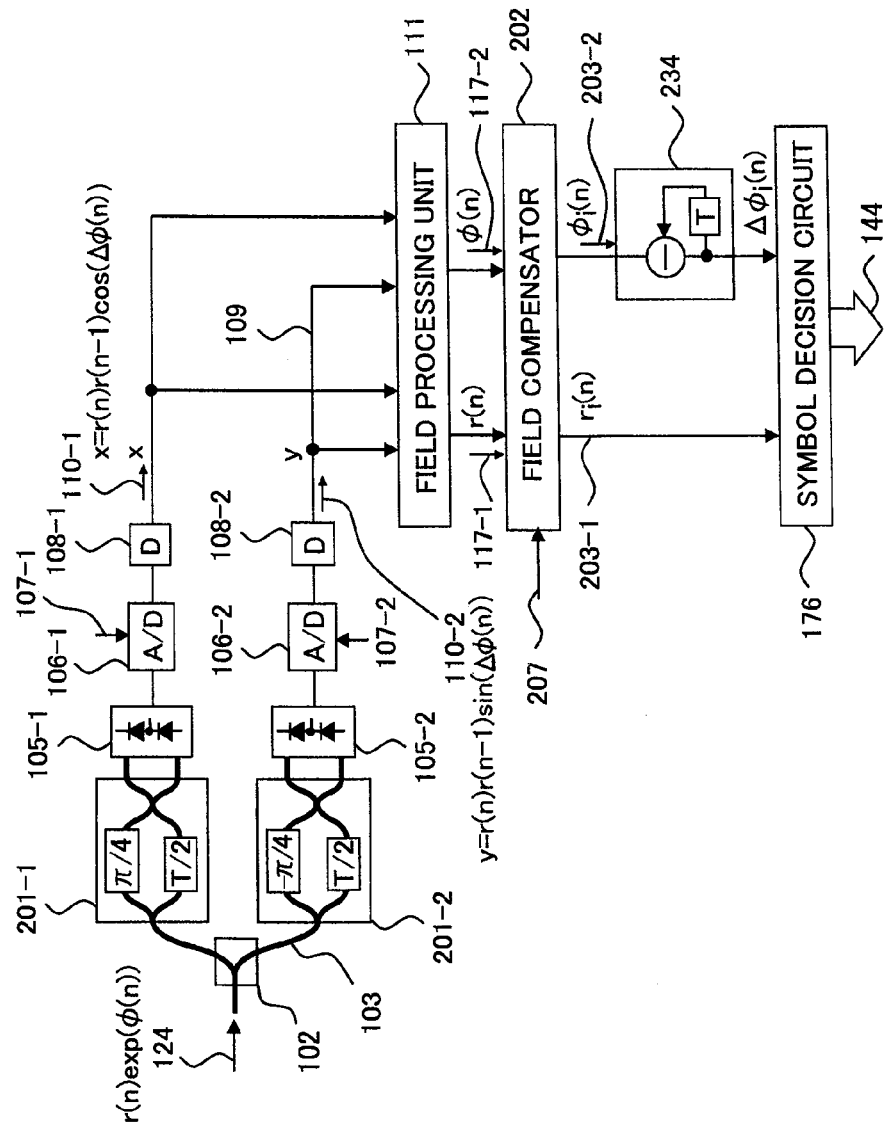
FIG. 25 is a configuration view of an optical multilevel signal receiver showing a thirteenth embodiment of the optical field receiver according to the present invention.
Figure 26:
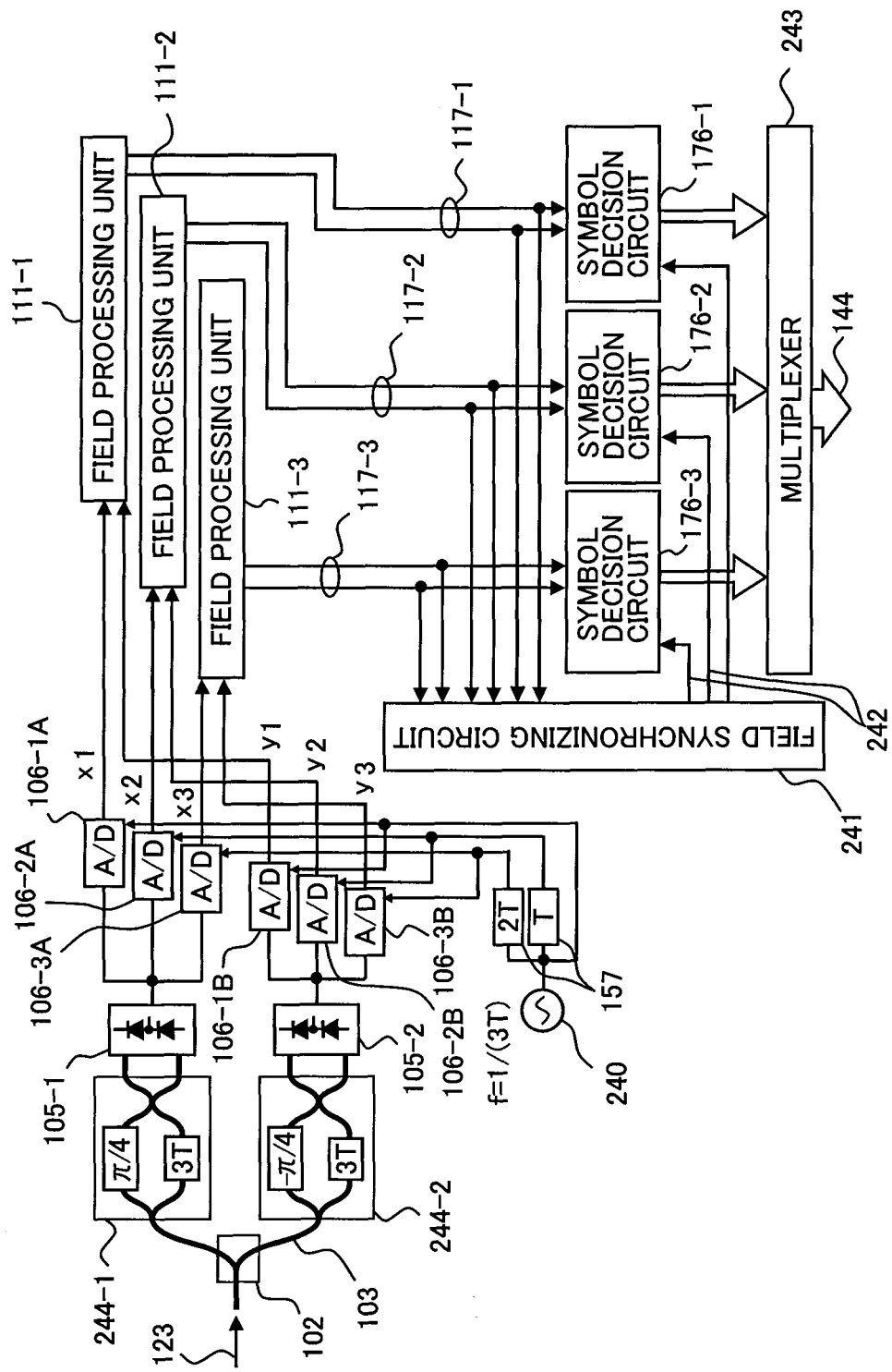
FIG. 26 is a configuration view of an interleave sampling type optical multilevel signal receiver showing a fourteenth embodiment of the optical field receiver according to the present invention.
Figure 27:
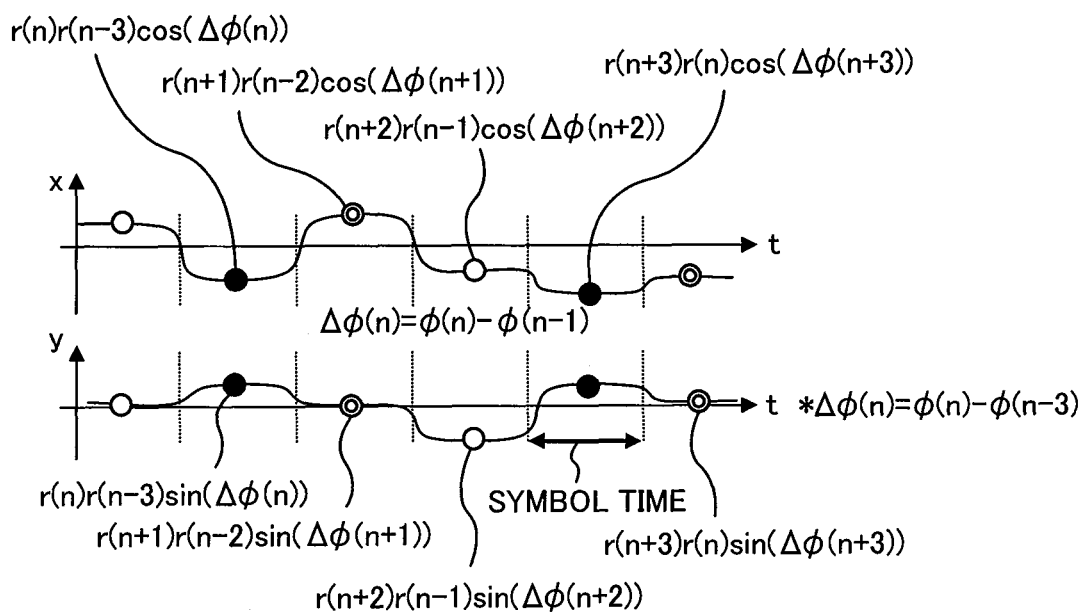
FIG. 27 is a view for explaining an interleave operation according to the fourteenth embodiment.

100: OPTICAL FIELD RECEIVER
101: INPUT OPTICAL SIGNAL
102: OPTICAL BRANCHING CIRCUIT
103: OPTICAL SIGNAL PATH
104 (104-1 and 104-2): OPTICAL DELAYED DEMODULATOR
105 (105-1 and 105-2): BALANCED OPTICAL RECEIVER
106 (106-1 to 106-3 and 106-1A to 106-3A and 106-1B to 106-3B): A/D CONVERTER
107 (107-1 to 107-3): SAMPLING CLOCK SIGNAL
108 (108-1 to 108-3): DELAY ADJUSTING CIRCUIT
109: ELECTRIC SIGNAL PATH
110 (110-1 to 110-3): ELECTRICAL RECEIVED SIGNAL
111 (111 and 111-1 to 111-3): FIELD PROCESSING UNIT
112: SQUARE ROOT PROCESSOR
113: INVERSE TANGENT CIRCUIT
114 (114-1 and 114-2): OUTPUT SIGNAL
115: DELAYED DIVIDER
116: DELAYED ADDER
117 (117 and 117-1 to 117-3): RECONSTRUCTED OPTICAL FIELD SIGNAL
120: PACKET SEGMENTING CIRCUIT
121: PACKET ASSEMBLING CIRCUIT
123: OPTICAL MULTILEVEL SIGNAL
124: OPTICAL APSK SIGNAL
130: LOCAL LASER
131: POLARIZATION SPLITTER
132 (132 and 132-1 and 132-2): LOCAL LIGHT
133: P POLARIZATION COMPONENT OF OPTICAL MULTILEVEL SIGNAL
134: S POLARIZATION COMPONENT OF OPTICAL MULTILEVEL SIGNAL
135 (135-1 and 135-2): COHERENT OPTICAL FIELD RECEIVERS
136: PHASE DIVERSITY CIRCUIT
137: I COMPONENT OUTPUT LIGHT
138: Q COMPONENT OUTPUT LIGHT
140 (140-1 and 140-2): OUTPUT SIGNAL 141: DIGITAL SIGNAL PROCESSOR
142 (142-1 to 142-4): OUTPUT SIGNAL
143: SYMBOL DECISION CIRCUIT
144: RECONSTRUCTED MULTILEVEL DIGITAL SIGNAL
150: OPTICAL BRANCHING CIRCUIT
151: OPTICAL INTENSITY RECEIVER
152 (152 and 152-1 to 152-3): BINARY DECISION CIRCUIT
153 (153 and 153-1 to 153-3) BINARY RECONSTRUCTED DIGITAL SIGNAL
154 (154-1 and 154-2): ADDER
155 (155-1 and 155-2): WEIGHTING CIRCUIT
156: FOUR-QUADRANT MULTIPLIER
157 (157 and 157-1 and 157-2): DELAYED CIRCUIT
158 (158-1 and 158-2): MULTIPLIER
159: BINARY DIFFERENTIAL PHASE SHIFT KEYING LIGHT
160: SQUARE ROOT CIRCUIT
161: CLOCK EXTRACTION CIRCUIT
171: SUBTRACTOR
172: RECONSTRUCTED FIELD SIGNAL
173: PHASE ANGLE
174: PHASE FLUCTUATION ESTIMATOR
175: ESTIMATION VALUE OF PHASE FLUCTUATION
176 (176 and 176-1 to 176-3): SYMBOL DECISION CIRCUIT THAT DOES NOT DEPEND ON PHASE FLUCTUATION
191: MULTIPLE FREQUENCY CLOCK SOURCE
192 (192 and 192-1 and 192-2): RESAMPLING CIRCUIT
193: DECISION-FEEDBACK EQUALIZER
194: DECISION-FEEDBACK SIGNAL
195 (195-1 and 195-2): AUTOMATIC GAIN CONTROLLER
197: N-LEVEL OPTICAL PHASE MODULATION SIGNAL
198: RECTANGULAR COORDINATES TRANSFORMER
200 (200 and 200-1 to 200-3 and 200-1A to 200-3A and 200-1B to 200-3B): FULL-FLEDGED OPTICAL FIELD RECEIVER
201 (201-1 and 201-2): OPTICAL DELAYED DEMODULATORS OF DELAYED QUANTITY T/2
202: FIELD COMPENSATOR
203 (203 and 203-1 and 203-2): FIELD SIGNAL AFTER COMPENSATION
204: TRANSMISSION OPTICAL FIELD
205: TRANSMISSION LINE
206 (206 and 206-1 to 206-6): OPTICAL FIBER TRANSMISSION LINE
207 (207 and 207-1 to 207-3): COMPENSATION QUANTITY INPUT TERMINAL
208: FIELD PROCESSING UNIT
210: OPTICAL MULTILEVEL SIGNAL TRANSMITTER
211: FOUR MULTIPLYING CIRCUIT
212: DEVIATION MINIMIZING CONTROLLER
213: BINARY AMPLITUDE SHIFT KEYING OPTICAL TRANSMITTER
214: EYE OPENING DETECTOR
215: MAXIMIZING CONTROLLER
220 (220A and 220B): OPTICAL WAVELENGTH MULTIPLEXING TRANSMISSION EQUIPMENT
221 (221A and 221B): NODE CONTROLLER
222 (222 and 222A and 222B): DATABASE
223 (223A and 223B): WAVELENGTH DIVISION MULTIPLEXER
224 (224A and 224B): WAVELENGTH DIVISION DEMULTIPLEXER
225 (225-1 to 225-4): OPTICAL AMPLIFIER
226 (226-1A to 226-3A and 226-1B to 226-3B): OPTICAL TRANSMITTER
230 (230-1 to 230-4): OPTICAL ADM
231: CONTROL CONSOLE
232 (232-1 to 232-3) PATH OF OPTICAL SIGNAL
233 (233-1 to 233-3): COMMUNICATION PATH OF COMPENSATION QUANTITY SETTING SIGNAL
234: DELAYED DEMODULATOR
240: DIVISION CLOCK SOURCE
241: FIELD SYNCHRONIZATION CIRCUIT
242: CORRECTION SIGNAL
243: MULTIPLEXER
244 (244-1 and 244-2): OPTICAL DELAYED DEMODULATOR OF DELAYED QUANTITY 3T

What is claimed is:

1. An optical field receiver for receiving an optical multilevel signal, the optical field receiver comprising:
   an optical branching circuit for branching a received optical multilevel signal into first and second optical signals;
   a first optical delayed demodulator for performing delayed demodulation on the first optical signal at a delay time T to output a delayed demodulation signal representing x component of a complex signal, where T is symbol time of the optical multilevel signal;
   a second optical delayed demodulator for performing delayed demodulation on the second optical signal at the delay time T with an optical phase difference deviating from the first optical delayed demodulator by 90° to output a delayed demodulation signal representing y component of the complex signal;
   first and second optical receivers for converting the delayed demodulation signals output from the first and second delayed demodulators into first and second electrical signals, respectively;
   an optical field processing unit using the first and second electrical signals as input for generating a first reconstructed signal and a second reconstructed signal, the first reconstructed signal being generated using and hence representing a value of an inter-symbol optical carrier phase difference from a symbol before 1 symbol time including transmitted data information based on the first and second electrical signals for each symbol time T, the second reconstructed signal being generated using and hence representing an amplitude value of the received symbol based on the first and second electrical signals for each symbol time T; and
   a symbol decision circuit for decoding a multilevel digital signal corresponding to the received symbol on the basis of the first reconstructed signal and the second reconstructed signal output from the optical field processing unit.

2. The optical field receiver according to claim 1, wherein the optical field processing unit generates the first reconstructed signal by calculating a value of an optical carrier phase angle of a received symbol including the transmitted data information based on the first and second electrical signals for each symbol time T, the first reconstructed signal representing the value of the optical carrier phase angle.

3. The optical field receiver according to claim 1, wherein the optical field processing unit generates an amplitude value to be newly output as the second reconstructed signal for the current symbol time T(n) by dividing the amplitude value of the delayed demodulation signal obtained by a square root operation of a square sum of the first and second electrical signals by the amplitude value of received symbol having been output as the second reconstructed signal before one symbol time T(n−1).

4. The optical field receiver according to claim 1, wherein the optical field processing unit generates value of the inter-symbol optical carrier phase difference to be output as the first reconstructed signal by an inverse tangent operation of the first and second electrical signals.

5. The optical field receiver according to claim 1, wherein the optical field processing unit generates value of the optical carrier phase angle to be output as the first reconstructed signal for the current symbol time T(n) on the basis of the inter-symbol optical carrier phase difference calculated from the first and second electrical signals and the value of the optical carrier phase angle having been output as the first reconstructed signal before at least 1 symbol time T(n−1).

6. The optical field receiver according to claim 1, further comprising a delay adjusting unit for adjusting a propagation time difference of two signal paths reaching the optical field processing unit through the first and second optical delayed demodulators from the optical branching circuit so as to be the symbol time T or less.

7. The optical field receiver according to claim 1, further comprising a rectangular (Cartesian) coordinates transformer for transforming the value of the optical carrier phase angle and amplitude value generated by the optical field processing unit into an in-phase component (I component) and a quadrature-phase component (Q component) of the complex signal and outputting them as the first and second reconstructed signals, respectively.

8. The optical field receiver according to claim 1, further comprising a plurality of A/D converters for converting the electrical signals output from each of the optical receivers into digital signals,
wherein the optical field processing unit generates the first and second reconstructed signals by digital processing.

9. An optical multilevel signal receiver comprising:
the optical field receiver according to claim 8;
wherein each of the A/D converters converts an electrical signal output from each of the optical receivers into a digital signal at a sampling speed corresponding to two times or more of a symbol rate (1/T).

10. The optical multilevel signal receiver according to claim 9, wherein the symbol decision circuit includes a waveform equalizer for compensating the waveform degradation of the first and second reconstructed signals.

11. An optical multilevel signal receiver comprising:
the optical field receiver according to claim 1;
wherein the symbol decision circuit is configured to decode a multilevel digital signal corresponding to the received signal on the basis of an output signal from the optical field receiver.

12. An optical multilevel signal receiver comprising:
the optical field receiver according to claim 1;
wherein the symbol decision circuit includes means for eliminating a phase fluctuation component from an optical carrier phase angle represented by the first reconstructed signal and generating the multilevel digital signal on the basis of the value of the optical carrier phase angle from which the phase fluctuation component is eliminated and the amplitude value represented by the second reconstructed signal.

13. An optical field receiver for receiving an optical multilevel signal modulated by a combination of phase modulation and amplitude modulation, the optical field receiver comprising:

an optical branching circuit for branching the received optical multilevel signal into first, second, and third optical signals;
a first optical delayed demodulator for performing delayed demodulation on the first optical signal at a delay time T to output a delayed demodulation signal representing x component of a complex signal, where T is symbol time of the optical multilevel signal;
a second optical delayed demodulator for performing delayed demodulation on the second optical signal at the delay time T with an optical phase difference deviating from the first optical delayed demodulator by 90° to output a delayed demodulation signal representing y component of the complex signal;
first and second optical receivers for converting the delayed demodulation signals output from the first and second delayed demodulators into first and second electrical signals, respectively;
a third optical receiver for converting the third optical signal into an electrical optical intensity signal;
an optical field processing unit using the first and second electrical signals as input for generating a first reconstructed signal and a second reconstructed signal, the first reconstructed signal being generated using and hence representing a value of an inter-symbol optical carrier phase difference from a symbol before 1 symbol time including transmitted data information based on the first and second electrical signals output from the first and second optical receivers for each symbol time T, the second reconstructed signal being generated using and hence representing an amplitude value of the received optical signal based on the electrical optical intensity signal output from the third optical receiver; and
a symbol decision circuit for decoding a multilevel digital signal corresponding to the received symbol on the basis of the first and second reconstructed signals output from the optical field processing unit.

14. The optical field receiver according to claim 13, further comprising a plurality of A/D converters for converting the electrical signals output from each of the optical receivers into digital signals,
wherein the optical field processing unit generates the first and second reconstructed signals by digital processing.

15. The optical field receiver according to claim 13, wherein the optical field processing unit generates the first reconstructed signal by calculating a value of an optical carrier phase angle of a received symbol including the transmitted data information based on the first and second electrical signals for each symbol time T, the first reconstructed signal representing the value of the optical carrier phase angle.

16. An optical field receiver for receiving an optical signal subjected to multilevel modulation of two levels or more, the optical field receiver comprising:
an optical branching circuit for branching the received optical multilevel signal into first and second optical signals;
a first optical delayed demodulator for performing delayed demodulation on the first optical signal at a delay time t of T/2 or less to output a delayed demodulation signal representing x component of a complex signal, where T is symbol time of the optical multilevel signal;
a second optical delayed demodulator for performing delayed demodulation on the second optical signal at the delay time t with an optical phase difference deviating from the first optical delayed demodulator by 90° to output a delayed demodulation signal representing y component of the complex signal;

first and second optical receivers for converting the delayed demodulation signals output from the first and second delayed demodulators into first and second electrical signals, respectively;

first and second A/D converters for converting the first and second electrical signals output from the first and second optical receivers into first and second digital signals at a sampling period t, respectively; and an optical field processing unit using the first and second electrical signals as input for generating a first reconstructed signal and a second reconstructed signal, the first reconstructed signal being generated using and hence representing a value of an inter-symbol optical carrier phase difference from a symbol before 1 symbol time including transmitted data information based on the first and second electrical signals for each symbol time T, the second reconstructed signal being generated using and hence representing an amplitude value of the received symbol based on the first and second digital signals at the sampling period t; and a symbol decision circuit for generating a multilevel digital signal corresponding to the received symbol on the basis of the first and second reconstructed signals.

17. The optical field receiver according to claim 16, wherein the field processing unit includes an optical field compensator for compensating waveform degradation of the first and second reconstructed signals, the waveform degradation having been generated in an external optical transmission line through which the optical multilevel signal has been transmitted.

18. The optical field receiver according to claim 17, wherein the optical field compensator includes an automatic controller for optimizing waveform degradation compensation quantity.

19. An optical transmission equipment comprising:
at least one optical field receiver according to claim 17; and
a memory for storing chromatic dispersion information of a plurality of optical fiber sections configuring the external optical transmission line; and
a controller,
wherein the controller calculates a total amount of chromatic dispersion in the external transmission line forming the path of the optical multilevel signal to be input to the optical multilevel signal receiver, on the basis of the chromatic dispersion information stored in the memory and sets the waveform degradation compensation quantity determined in accordance with the total amount of chromatic dispersion to the optical field compensator.

20. The optical field receiver according to claim 16, further comprising a delay adjusting means for adjusting propagation time difference of two signal paths reaching the field processing unit through the first and second optical delayed demodulators from the optical branching circuit so as to be the delay time t or less.

* * * * *